(12) United States Patent
Sato et al.

(10) Patent No.: US 8,969,789 B2
(45) Date of Patent: Mar. 3, 2015

(54) ROTARY ENCODER AND METHOD OF DETECTING ABNORMALITY OF ROTARY ENCODER

(71) Applicant: OMRON Corporation, Kyoto-shi (JP)

(72) Inventors: Toshinori Sato, Ritto (JP); Akihiko Morikawa, Kyoto (JP); Takao Ushiyama, Ritto (JP); Junichi Ueno, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 178 days.

(21) Appl. No.: 13/776,854

(22) Filed: Feb. 26, 2013

(65) Prior Publication Data

US 2013/0240719 A1  Sep. 19, 2013

(30) Foreign Application Priority Data

Mar. 15, 2012  (JP) .................................. 2012-058275

(51) Int. Cl.
*G01D 5/34* (2006.01)
*G01D 5/244* (2006.01)

(52) U.S. Cl.
CPC .............. *G01D 5/34* (2013.01); *G01D 5/24466* (2013.01)
USPC ............. 250/231.14; 250/231.16; 250/214 R; 341/13

(58) Field of Classification Search
USPC ............. 250/231.13, 231.14, 231.16–231.18, 250/214 R; 341/9, 11, 13
See application file for complete search history.

(56) References Cited

U.S. PATENT DOCUMENTS

| 4,600,835 A * | 7/1986 | Ishida et al. ............. 250/231.16 |
| 2008/0054167 A1* | 3/2008 | Sasaki et al. .................. 250/216 |
| 2011/0202308 A1* | 8/2011 | Kishida et al. ................ 702/151 |

OTHER PUBLICATIONS

"Incremental Encoders".(2011). Retrieved on Feb. 3, 2012, from http://www.kuebler.cn/PDFs/leaflet/drehgeber/chinese/5814-5834_SIL_cn.pdf.
"Incremental rotary encoder".(2009). Retrieved on Feb. 3, 2012, from http://files.pepperl-fuchs.com/selector_files/navi/productInfo/edb/t41131_eng.pdf.
"iC-RC1000 SIN/COS Signal Safety Monitor IC".(2011). Retrieved on Feb. 3, 2012, from http://www.ichaus.de/upload/pdf/RC1000_datasheet_A2en.pdf.
"iC-MSBSafety, iC-MSB2 SIN/COS Signal Conditioner With 1Vpp Driver".(2006). Retrieved on Feb. 3, 2012, from http://www.ichaus.de/upload/pdf/MSB_datasheet_D2en.pdf.

* cited by examiner

*Primary Examiner* — Kevin Pyo
(74) *Attorney, Agent, or Firm* — Marvin A. Motsenbocker; Mots Law, PLLC

(57) ABSTRACT

A signal output unit generates an A phase output signal of a rectangular wave and a B phase output signal of a rectangular wave from the A phase sinusoidal wave signal and the B phase sinusoidal wave signal, respectively and outputs the generated signals. An internal signal generating unit (comparator) generates an A phase internal signal of a rectangular wave and a B phase internal signal of a rectangular wave from the A phase sinusoidal wave signal and the B phase sinusoidal wave signal, respectively, which are further processed by counters, and an abnormality detector. Each counter resets in response to a pulse edge of a signal for detection. The abnormality detector detects an abnormality when the count value of at least one of counters reaches a prescribed value.

11 Claims, 22 Drawing Sheets

FIG. 12

| | COUNTER (46) | COUNTER (47) | COUNTER (56) | COUNTER (57) |
|---|---|---|---|---|
| COUNT SIGNAL | A PHASE INTERNAL SIGNAL | B PHASE INTERNAL SIGNAL | A PHASE OUTPUT SIGNAL | B PHASE OUTPUT SIGNAL |
| RESET SIGNAL | B PHASE OUTPUT SIGNAL | A PHASE OUTPUT SIGNAL | B PHASE INTERNAL SIGNAL | A PHASE INTERNAL SIGNAL |
| ABNORMALITY OF A PHASE INTERNAL SIGNAL | | | | DETECTABLE |
| ABNORMALITY OF B PHASE INTERNAL SIGNAL | | | DETECTABLE | |
| ABNORMALITY OF A PHASE OUTPUT SIGNAL | | DETECTABLE | | |
| ABNORMALITY OF B PHASE OUTPUT SIGNAL | DETECTABLE | | | |
| ABNORMALITY OF BOTH OF A PHASE OUTPUT SIGNAL AND B PHASE OUTPUT SIGNAL | DETECTABLE | DETECTABLE | | |
| ABNORMALITY OF BOTH OF A PHASE INTERNAL SIGNAL AND B PHASE INTERNAL SIGNAL | | | DETECTABLE | DETECTABLE |

ROTARY ENCODER AND METHOD OF DETECTING ABNORMALITY OF ROTARY ENCODER

CROSS REFERENCE TO RELATED APPLICATIONS

This application claims priority based on 35 USC 119 from prior Japanese Patent Application No. P2012-058275 filed on Mar. 15, 2012, entitled "ROTARY ENCODER AND METHOD OF DETECTING ABNORMALITY OF ROTARY ENCODER", the entire contents of which are incorporated herein by reference.

TECHNICAL FIELD

The invention relates to detecting internal abnormalities of a rotary encoder.

BACKGROUND

A rotary encoder is a sensor that detects a position or rotation speed by converting a mechanical displacement amount attributable to rotation into an electrical signal, and by processing the signal.

Rotary encoders are broadly categorized into an incremental type and an absolute type. Generally, the incremental rotary encoders output a signal of two phases called an A phase and a B phase. Generally, this phase difference is a 90-degree electrical angle. A direction of rotation (normal rotation and reverse rotation) is detectable using such a phase relation.

The incremental rotary encoders are categorized into a type (rectangular wave incremental encoder) in which the A phase signal and the B phase signal are rectangular waves, and a type (SIN/COS incremental encoder) in which the A phase signal and the B phase signal are sinusoidal waves. The rectangular wave incremental encoder is a rotary encoder of the type that outputs a rectangular wave (pulse signal) according to a rotational displacement amount of a shaft. Some products among the rectangular wave incremental encoders also output a rectangular wave signal called a Z phase (an output per one rotation) in addition to the A phase and the B phase. The number of pulses output from the rotary encoder is counted by a counter. The amount of rotation is detected from the counted value of the counter.

Using the above-described features, the rotary encoder generates information of devices, for example, an automatic assembly machine, such as speed, moving displacement amount, acceleration, moving direction, etc. The user can control a device or detect various states based on the information.

Inside such a rotary encoder, abnormalities, described below are likely:

(1) Short-circuit in an output circuit to output an A phase signal and a B phase signal;

(2) Disconnection in the output circuit to output the A phase signal and the B phase signal;

(3) Fixation of the logic of either or both of the A phase signal and the B phase signal at either "H" or "L"; and (4) Abnormality in a detection system (for example, unflashing of a light projecting element, or the like).

When a certain abnormality of the internal abnormalities has occurred, the output of the rotary encoder indicates that a device stands still even though the device is operating. In such a case, although the device is operating actually, a worker is likely to determine that the device is standing still, from the output of the rotary encoder. Therefore, in order to secure worker's safety, there is the demand for detecting the internal abnormalities of the rotary encoder.

For example, there have been disclosed SIN/COS incremental encoders (refer to "Incremental Encoders" [online], searched on Feb. 3, 2012, Internet <URL:http://www.kuebler.cn/PDFs/leaflet/drehgeber/chinese/5814-5834_SIL_cn-.pdf> (hereinafter referred to as Non-Patent Document 1); and "Incremental rotary encoder" [online], searched on Feb. 3, 2012, Internet <URL:http://files.pepperl-fuchs.com/selector_files/navi/productl nfo/edb/t41131_eng.pdf> (hereinafter referred to as Non-Patent Document 2)). Further, there have been disclosed ICs (semiconductor integrated circuits), which diagnose an abnormality of an output signal of such an SIN/COS incremental encoder (refer to "iC-RC1000 SIN/COS SIGNAL SAFETY MONITOR IC", [online], searched on Feb. 3, 2012, Internet <URL: http://www.ichaus.de/upload/pdf/RC1000_datasheet_A2en.pdf>, <URL:http://www.ichaus.de/upload/pdf/RC1000_flyer_rev1.pdf> (hereinafter referred to as Non-Patent Document 3); and "iC-MSBSAFETY, iC-MSB2 SIN/COS SIGNAL CONDITIONER WITH 1Vpp DRIVER" [online], searched on Feb. 3, 2012, Internet <URL:http://www.ichaus.de/upload/pdf/MSB_datasheet_D2en.pdf> (hereinafter referred to as Non-Patent Document 4). With regard to the SIN/COS incremental encoder, the internal abnormalities of the above-mentioned items (1) to (4) are detectable through known signal processing which uses the theorem "$Sin^2 \theta + Cos^2 \theta = 1$".

However, the rotary encoders disclosed in Non-Patent Documents 1 and 2 output a signal used for detecting an internal abnormality of the concerned encoder. Therefore, to detect the internal abnormality of an encoder, a user has to build a circuit for detection and has to operate the circuit. Therefore, the user's burden increases.

In addition, when such an abnormality detecting device is built by the user-side, the abnormality detecting device serves as a functional safety-related unit. In order to make the abnormality detecting device built by the user to comply with safety-related standard, the device needs to be certificated by allowing a third party standard certificate authority to examine the device. From this point of view, the user's burden further increases.

In addition, to locate or measure a position or speed of rotation with the SIN/COS incremental encoder, it is necessary to process a changing SIN/COS wave into a rectangular wave outside of the encoder. In order to eliminate such signal processing outside of the encoder, a user may consider choosing the rectangular wave incremental encoder. However, Non-Patent Documents 1 to 4 do not disclose any rectangular wave incremental encoders.

SUMMARY

Therefore, an object of embodiments is to provide for detecting an internal abnormality of a rectangular wave incremental encoder.

In one aspect, an embodiment provides an incremental rotary encoder including: a rotation detector that outputs a continuous wave signal of a first phase and a continuous wave signal of a second phase according to rotation of a rotating body, the continuous signal of the first phase and the continuous signal of the second phase having a phase difference from each other; a signal output unit that generates a rectangular wave output signal of the first phase and a rectangular wave output signal of the second phase respectively from the continuous wave signal of the first phase and the continuous wave signal of the second phase and outputs the rectangular wave output signal of the first phase and the rectangular wave output signal of the second phase from the rotary encoder; an internal signal generator that generates a rectangular wave internal signal of the first phase and a rectangular wave internal signal of the second phase respectively from the continuous wave signal of the first phase and the continuous wave signal of the second phase; a first counter that sets a count value in response to a pulse edge of the rectangular wave internal signal of the first phase and resets the count value in response to a pulse edge of the rectangular wave output signal of the second phase; a second counter that sets a count value in response to a pulse edge of the rectangular wave internal signal of the second phase and resets the count value in response to a pulse edge of the rectangular wave output signal of the first phase; and an abnormality detector that detects an abnormality of the rotary encoder when the count value of at least one of the first and second counters has reached a prescribed value.

Preferably, the rotary encoder further includes a third counter, which sets a count value in response to the pulse edge of the rectangular wave output signal of the first phase and resets the count value in response to the pulse edge of the rectangular wave internal signal of the second phase and a fourth counter which sets a count value in response to the pulse edge of the rectangular wave output signal of the second phase and resets the count value in response to the pulse edge of the rectangular wave internal signal of the first phase. The abnormality detector detects the abnormality of the rotary encoder when the count value of at least one of the first to fourth counters has reached a prescribed value.

Preferably, the rotary encoder further includes an input circuit for receiving the rectangular wave output signal of the first phase and the rectangular wave output signal of the second phase, and a cable. The cable includes a first wiring and a second wiring for outputting the rectangular wave output signals of the first phase and the second phase to the outside of the rotary encoder from the signal output unit, a third wiring and a fourth wiring for inputting the rectangular wave output signals of the first phase and the second phase to the input circuit, and outer covers for covering the first to fourth wirings.

Preferably, the third and fourth wirings are connected to the first and second wirings, respectively in the vicinity of a terminal portion of the cable.

Preferably, an encoder includes: an input circuit for receiving rectangular wave output signals of a first phase and a second phase from a signal output unit; a housing that encases at least a rotation detector, a signal output unit, first and second counters, an abnormality detector, and the input circuit; and signal paths provided inside the housing, and used to input rectangular wave output signals of the first phase and the second phase, which are output from the signal output unit, to the input circuit.

Preferably, the rotary encoder further includes a first pulse generating circuit that generates a first pulse in response to a pulse edge of the rectangular wave output signal of the first phase, a second pulse generating circuit that generates a second pulse in response to a pulse edge of the rectangular wave output signal of the second pulse, an AND circuit which performs an AND operation of the first pulse and the second pulse, and a short-circuit detecting counter that sets a count value in response to an output signal of. The abnormality detector detects the abnormality of the rotary encoder when the count value of the short-circuit detecting counter has reached a prescribed value.

Preferably, the abnormality detector outputs a first error signal and a second error signal when the abnormality of the rotary encoder has been diagnosed.

Another embodiment provides a method of detecting an abnormality of an incremental rotary encoder, including: outputting a continuous wave signal of a first phase and a continuous wave signal of a second phase from a rotation detector according to rotation of a rotating body, the continuous signal of the first phase and the continuous signal of the second phase having a phase difference from each other; by a signal output unit, generating a rectangular wave output signal of the first phase and a rectangular wave output signal of the second phase from the continuous wave signal of the first phase and the continuous wave signal of the second phase, respectively and outputting the rectangular wave output signals of the first phase and the second phase from the rotary encoder; by an internal signal generator, generating a rectangular wave internal signal of the first phase and a rectangular wave internal signal of the second phase from the continuous wave signal of the first phase and the continuous wave signal of the second phase, respectively; at a first counter, setting a first count value in response to a pulse edge of the rectangular wave internal signal of the first phase and resetting the first count value in response to a pulse edge of the rectangular wave output signal of the second phase; at a second counter, setting a second count value in response to a pulse edge of the rectangular wave internal signal of the second phase and resetting the second count value in response to a pulse edge of the rectangular wave output signal of the first phase; and by an abnormality detector, detecting an abnormality of the rotary encoder when at least one of the first and second count values has reached a prescribed value.

Preferably, the method of detecting an abnormality further includes: at a third counter, setting a third count value in response to the pulse edge of the rectangular wave output signal of the first phase and resetting the third count value in response to the pulse edge of the rectangular wave internal signal of the second phase; and at a fourth counter, setting a fourth count value in response to the pulse edge of the rectangular wave output signal of the second phase and resetting the fourth count value in response to the pulse edge of the rectangular wave internal signal of the first phase. The abnormality detector detects the abnormality of the rotary encoder when at least one of the first to fourth count values has reached the prescribed value.

Preferably, the method of detecting an abnormality further includes: by a first pulse generating circuit, generating a first pulse in response to the pulse edge of the rectangular wave output signal of the first phase; by a second pulse generating circuit, generating a second pulse in response to the pulse edge of the rectangular wave output signal of the second pulse; by an AND circuit, performing an AND operation of the first pulse and the second pulse; and by a short-circuit detecting counter, setting a count value for short-circuit detection when a result of the AND operation is positive. The abnormality detector detects the abnormality of the rotary encoder when the count value for short-circuit detection has reached a prescribed value.

BRIEF DESCRIPTION OF THE DRAWINGS

FIG. 12 is a diagram of a tabular form showing signals for generating a count signal and a reset signal of each counter, and types of abnormalities detectable with each counter;

DETAILED DESCRIPTION

Hereinbelow, embodiments are described in detail with reference to the drawings. Like portions and corresponding portions among the drawings are denoted by the same reference signs and the description thereof is not repeated.

First Embodiment

Figure 1:
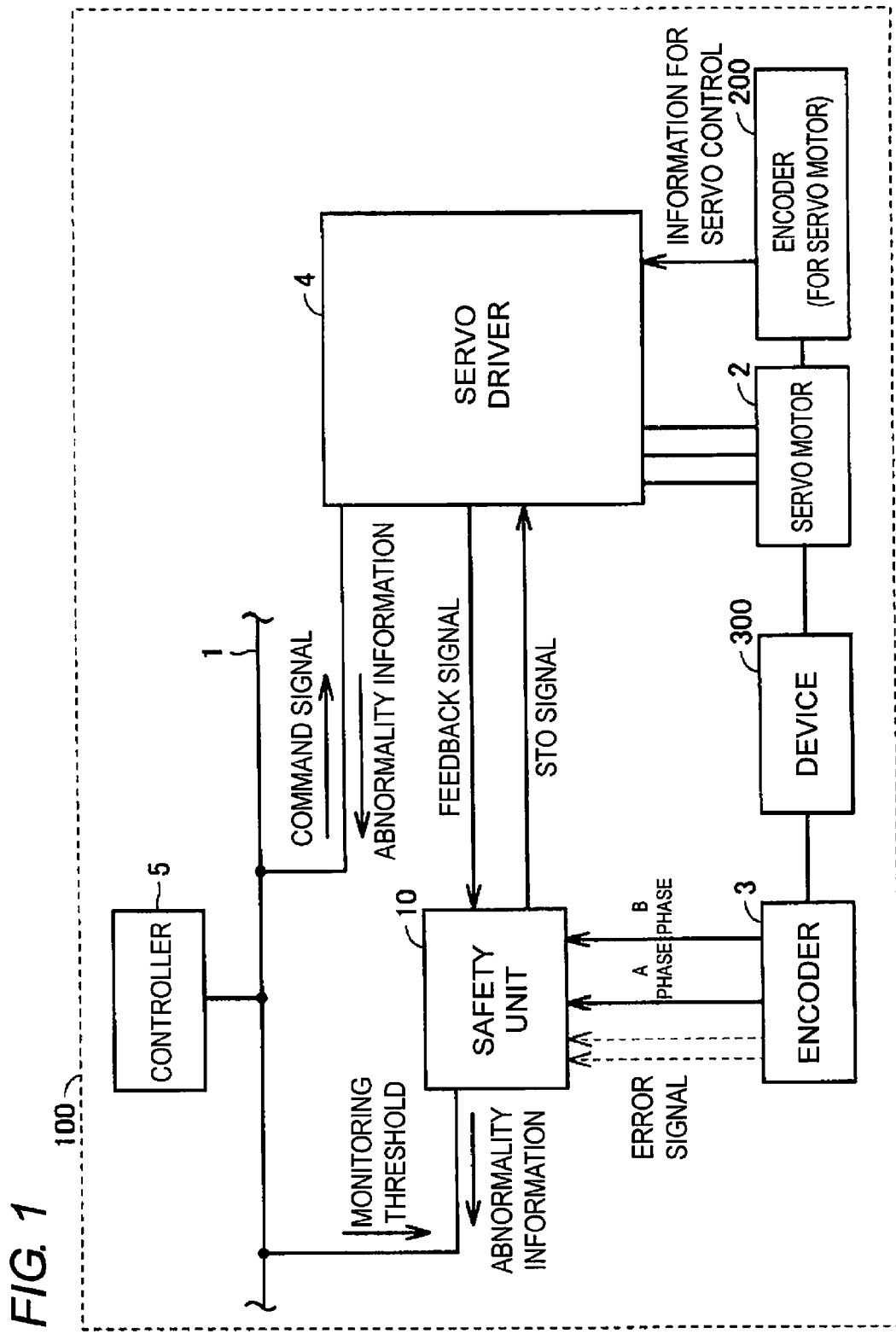
FIG. 1 is a schematic configuration view of a servo system 100 including a rotary encoder according to an embodiment of the invention.

FIG. 1 is a schematic configuration view of a servo system 100 including a rotary encoder according to an embodiment. With reference to FIG. 1, servo system 100 is used as a system for driving various mechanical devices (for example, an arm of an industrial robot), which are not illustrated. Servo system 100 includes network 1, servo motor 2, a rotary encoder (hereafter simply referred to as an "encoder") 3, servo driver 4, controller 5, and safety unit 10.

Servo motor 2 is an AC servo motor, for example. Encoder 200 is an encoder built in servo motor 2, and outputs information for servo controls, including rotation direction, rotation angle, and number of rotations, etc., to servo driver 4. Encoder 3 is a rectangular wave incremental encoder. Encoder 3 outputs an A phase signal and a B phase signal that are both a rectangular wave, according to rotation of a rotating body of device 300, i.e., rotation of a rotating shaft of a device 300 which is driven to rotate by servo motor 2. The A phase signal and the B phase signal are signals representing a displacement amount (angle of rotation) and a direction of rotation. The A phase signal and the B phase signal have a phase difference of 90 degrees from each other. The "direction of rotation" as used in the following description means a direction of rotation of the rotating shaft of the device 300 to which encoder 3 is attached.

Encoder 3 has a self-diagnosing function. An internal abnormality of encoder 3 is detected by this self-diagnosing. When the internal abnormality is detected, encoder 3 outputs two error signals that indicate detection of the abnormality.

Servo driver 4 receives a command signal from controller 5 via network 1 and also receives information for servo controls, including rotation direction, rotation angle, the number of rotations, etc., output from the encoder 200. Servo driver 4 drives servo motor 2 based on the command signal supplied from controller 5 and the information for servo controls supplied from the encoder 200. Safety unit 10 detects a rotation speed/position, etc. of the device 300 using the A phase signal and the B phase signal supplied from encoder 3, and monitors whether the detection result is within a monitoring threshold range controlled by controller 5. When the detection result is outside the monitoring threshold range controlled by controller 5, safety unit 10 outputs an STO signal as a stop signal to servo driver 4, for example. In addition, when the error signals are output from encoder 3, safety unit 10 also outputs the STO signal as the stop signal to servo driver 4, for example. In the configuration illustrated in FIG. 1, safety unit 10 corresponds to later-stage equipment connected to encoder 3. In addition, controller 5 may serve as the later-stage equipment connected to encoder 3 and the monitoring can be executed by controller 5.

Servo driver 4 sets a command value related to operation of servo motor 2, based on the command signal supplied from controller 5. Servo driver 4 drives servo motor 2 such that the operation of servo motor 2 may follow the command value. Specifically, servo driver 4 controls a driving current of servo motor 2 according to the command value.

In addition, servo driver 4 stops outputting of torque by servo motor 2 when the STO signal serving as the stop signal is input to servo driver 4. Specifically, when the STO signal is input into servo driver 4, servo driver 4 stops the supply of power to servo motor 2 by shutting off a power supply of servo motor 2.

In addition, servo driver 4 transmits a feedback signal indicating that a power supply of servo motor 2 has been shut off to the safety unit 10.

In addition, a power supply stopping function for stopping the supply of power to servo motor 2 may be implemented by an external interrupting device (for example, contactor), which is separately provided from servo driver 4.

Controller 5 is configured to include, for example, a programmable controller (PLC), a position control unit, etc. so as to control servo motor 2, and sends a command signal for drive control (for example, positioning control, etc.) of servo motor 2.

Safety unit 10 transmits abnormality information, which indicates the abnormality to controller 5 when the feedback signal sent from servo driver 4 is abnormal.

Figure 2:
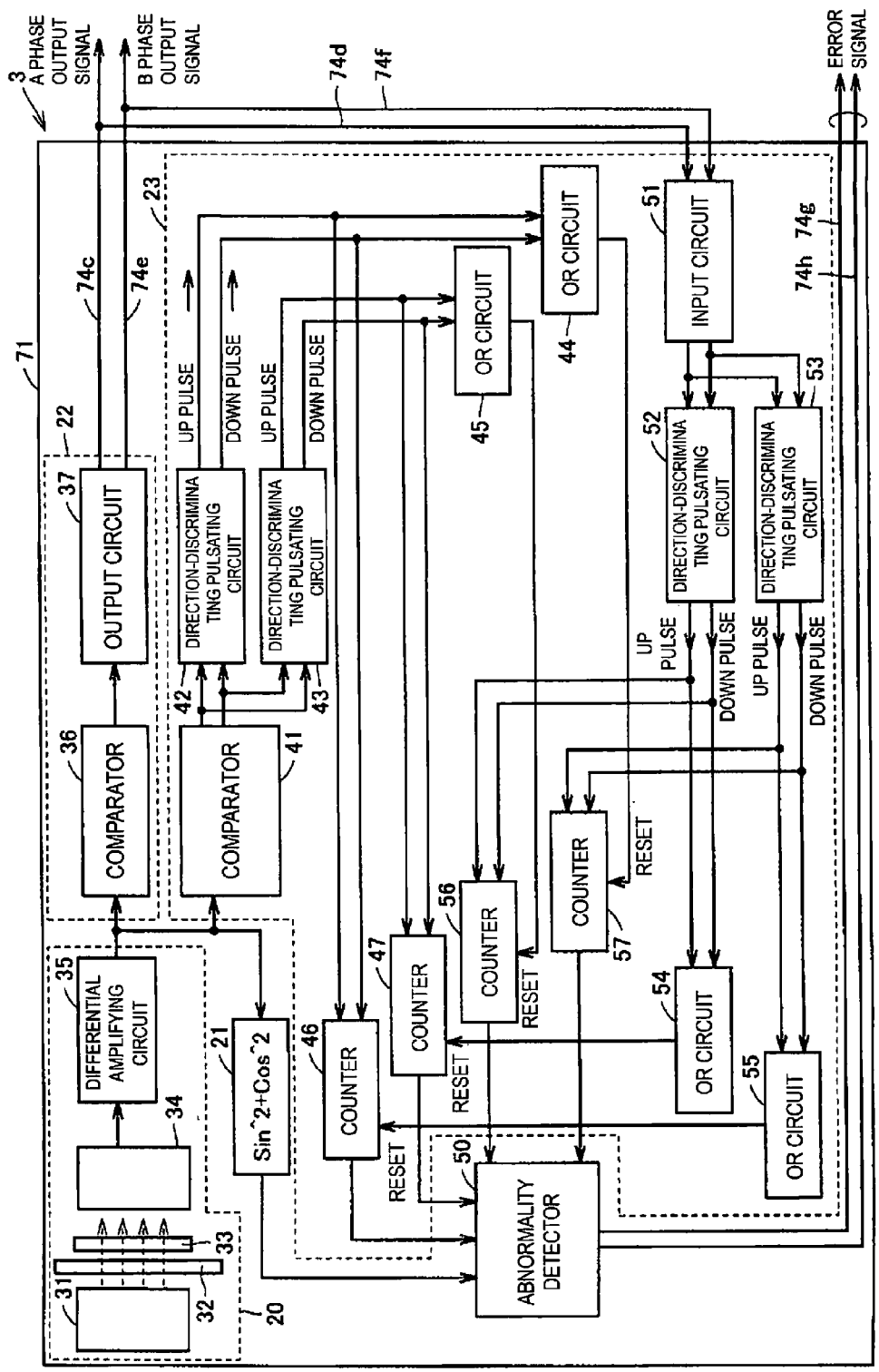
FIG. 2 is a block diagram of a rotary encoder according to a first embodiment of the invention.

FIG. 2 is a block diagram of a rotary encoder according to a first embodiment. With reference to FIG. 2, encoder 3 includes optical block 20, optical block diagnosing unit 21, signal output unit 22, output signal diagnosing unit 23, and abnormality detector 50. These blocks are mounted, for example, in circuit board, and are accommodated in housing 71. The configuration illustrated in FIG. 2 can be realized by a combination of hardware and software.

Optical block 20 outputs continuous wave signals that have a phase difference of 90 degrees from each other according to rotation of a rotating body, that is, a rotating shaft of servo motor 2 (not illustrated). According to this embodiment, an A phase sinusoidal wave signal and a B phase sinusoidal wave signal having a phase difference of 90 degrees from each other are output from optical block 20 as continuous wave signals. However, the continuous wave signals are not limited to sine wave, but may be triangular wave signals, for example. Optical block 20 includes light projecting element 31, rotational slit plate 32, fixed slit plate 33, light receiving element 34, and differential amplifying circuit 35.

Light projecting element 31 is formed of a light emitting diode (LED), for example. Light receiving element 34 is formed of a photo diode (PD), for example. Rotational slit plate 32 rotates along with rotation of a rotating shaft (not illustrated). The direction of rotation may be arbitrary, that is, a clockwise direction or a counterclockwise direction. Transmission and interception of light from light projecting element 31 are controlled by rotation of the rotational slit plate 32. Fixed slit plate 33 has two slits that are separately provided from each other and are shifted in phase by 90 degrees from each other. Light receiving element 34 outputs an electrical signal in response to light that has transmitted through rotational slit plate 32 and fixed slit plate 33. The differential amplifying circuit amplifies the sinusoidal wave signal. Thereby, the A phase sinusoidal wave signal and the B phase sinusoidal wave signal are output.

Signal output unit 22 converts the sinusoidal wave signal output from optical block 20 into a rectangular wave signal, and outputs the rectangular wave signal to the outside of encoder 3. Signal output unit 22 includes comparator 36 and output circuit 37. Comparator 36 compares a value of the sinusoidal wave signal with a prescribed value. Thereby, the sinusoidal wave signal is converted into the rectangular wave signal. Comparator 36 converts the A phase sinusoidal wave signal and the B phase sinusoidal wave signal into an A phase rectangular wave signal and a B phase rectangular wave signal, respectively.

Output circuit 37 outputs the A phase rectangular wave signal and the B phase rectangular wave signal to the outside of encoder 3. The A phase rectangular wave signal and the B phase rectangular wave signal, which are output from output circuit 37 are termed "A phase output signal" and "B phase output signal", respectively in the present specification.

In an embodiment, a "rectangular wave output signal of a first phase" and a "rectangular wave output signal of a second phase" are the A phase output signal and the B phase output signal, respectively, or vice versa. That is, when "the rectangular wave output signal of the first phase" is the A phase output signal, "the rectangular wave output signal of the second phase" is the B phase output signal. Conversely, when "the rectangular wave output signal of the first phase" is the B phase output signal, "the rectangular wave output signal of the second phase" is the A phase output signal.

The form of output circuit 37 is not particularly limited, but may be an open collector output, a voltage output, a line driver output, a complementary output, or the like, for example.

The A phase output signal and the B phase output signal are output from encoder 3 through A phase output line 74c and B phase output line 74e, respectively.

Optical block diagnosing unit 21 detects the abnormality of a detection system, i.e., optical block 20. Optical block diagnosing unit 21 computes the sum of a square value of the value of the A phase sine wave signal, and a square value of the value of the B phase sine wave signal using the relationship "$\sin^2 \theta + \cos^2 \theta = 1$". An acceptable value for the sum of squares is actually set. Therefore, a normal range (for example, 0.8 to 1.2) of the sum of the squares is set. For example, when light projecting element 31 does not flash, the sum of the squares is outside the above-mentioned normal range.

Therefore, optical block diagnosing unit 21 can detect abnormality of optical block 20. Optical block diagnosing unit 21 may monitor a light amount of light projecting element 31. Because a well-known technology is employable to diagnose optical block 20, a detailed description thereof is not given below.

The diagnostic result of optical block diagnosing unit 21 is sent to abnormality detector 50. When the diagnostic result of optical block diagnosing unit 21 indicates the abnormality of optical block 20 (for example, when the sum of two square values differs from 1), abnormality detector 50 outputs two error signals from encoder 3. The two error signals travel through error signal lines 74g and 74h, respectively from encoder 3.

Output signal diagnosing unit 23 detects the abnormality of the A phase output signal and the B phase output signal. Output signal diagnosing unit 23 includes comparator 41, direction-discriminating pulsating circuits 42, 43, 52, and 53, OR circuits 44, 45, 54, and 55, counters 46, 47, 56, and 57, and input circuit 51.

Comparator 41 compares the value of the sinusoidal wave signal output from optical block 20 with the prescribed value to generate rectangular wave signals. Comparator 41 converts the A phase sinusoidal wave signal and the B phase sinusoidal wave signal into an A phase rectangular wave signal and a B phase rectangular wave signal, respectively. The rectangular wave signals generated by comparator 41 are henceforth termed an "A phase internal signal" and a "B phase internal signal" to distinguish the A phase output and B phase output signals, respectively.

In an embodiment, a "rectangular wave internal signal of a first phase" and a "rectangular wave internal signal of a second phase" are the A phase internal signal and the B phase internal signal, respectively, or vice versa. However, "the rectangular wave internal signal of the first phase" is an internal signal having the same phase as "the rectangular wave output signal of the first phase." "The rectangular wave internal signal of the second phase" is an internal signal having the same phase as "the rectangular wave output signal of the second phase."

Each of direction-discriminating pulsating circuits 42 and 43 outputs count signals including an up pulse and a down pulse, based on the A phase internal signal and the B phase internal signal. The up pulse and the down pulse represent direction of rotation of the rotating shaft (not illustrated). When the direction of rotation is clockwise, each of direction-discriminating pulsating circuits 42 and 43 outputs the up pulse. When the direction of rotation is counterclockwise, each of the direction-discriminating pulsating circuits 42 and 43 outputs the down pulse.

Figure 3:
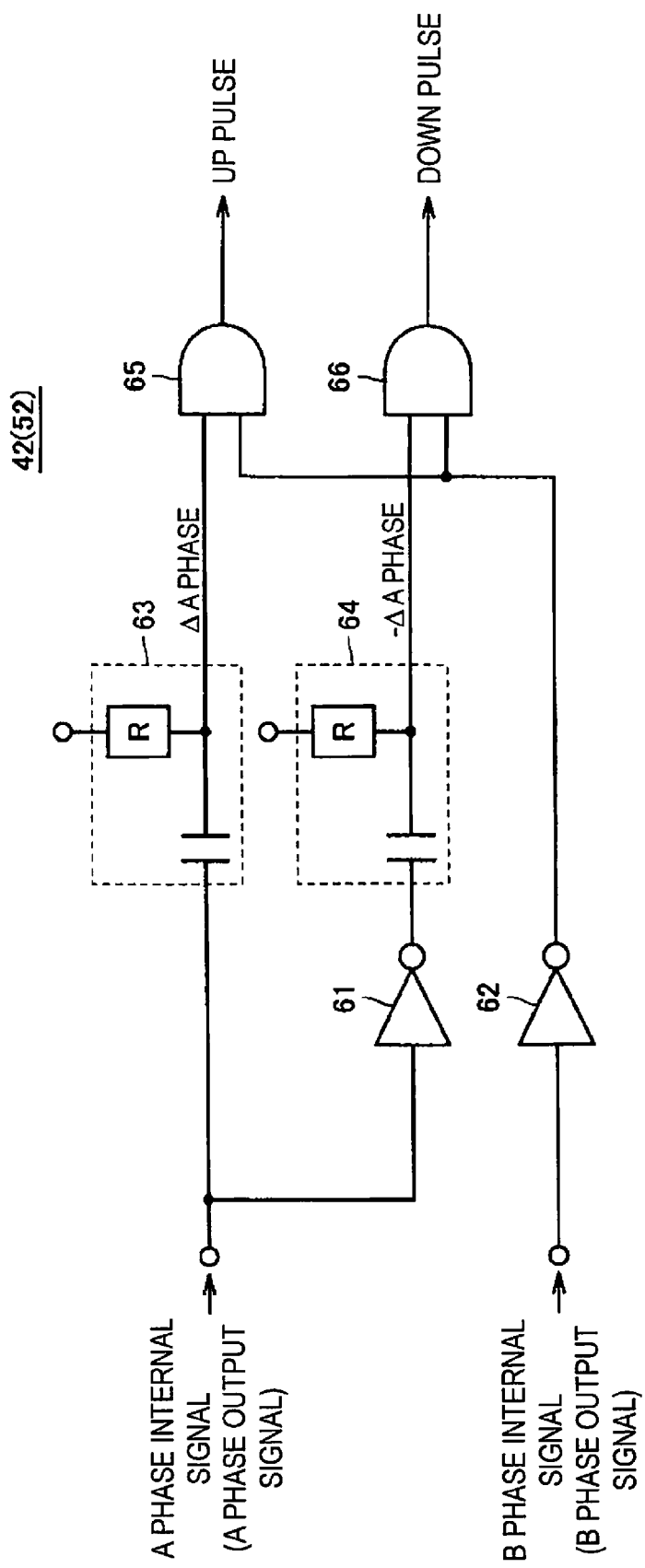
FIG. 3 is a circuit diagram exemplifying a configuration of a direction-discriminating pulsating circuit 42 illustrated in FIG. 2.

FIG. 3 is a circuit diagram exemplifying a configuration of direction-discriminating pulsating circuit 42 illustrated in FIG. 2. With reference to FIG. 3, direction-discriminating pulsating circuit 42 includes inverters 61 and 62, differentiating circuits 63 and 64, and AND circuits 65 and 66.

Inverters 61 and 62 output an inversion signal of the A phase internal signal, and an inversion signal of the B phase internal signal, respectively. Each of differentiating circuits 63 and 64 comprises a resistor and a capacitor. Differentiating circuit 63 generates a pulse (ΔA phase pulse), which indicates a rising edge of the A phase internal signal. Differentiating circuit 64 generates a pulse (-ΔA phase pulse), which indicates a rising edge of a signal obtained by inverting the A phase internal signal, i.e., a falling edge of the A phase internal signal.

An output signal of differentiating circuit 63 is input to one input terminal of AND circuit 65. The inversion signal of the B phase internal signal is input to the other input terminal of AND circuit 65. AND circuit 65 outputs the up pulse in response to the rising edge of the A phase internal signal.

An output signal of differentiating circuit 64 is input to one input terminal of AND circuit 66. The inversion signal of the B phase internal signal is input to the other input terminal of AND circuit 65. AND circuit 66 outputs the down pulse in response to the falling edge of the A phase internal signal.

Direction-discriminating pulsating circuit 52 has the same configuration as that illustrated in FIG. 3. In FIG. 3, the A phase internal signal is replaced with the A phase output signal, and the B phase internal signal is replaced with the B phase output signal.

Figure 4:
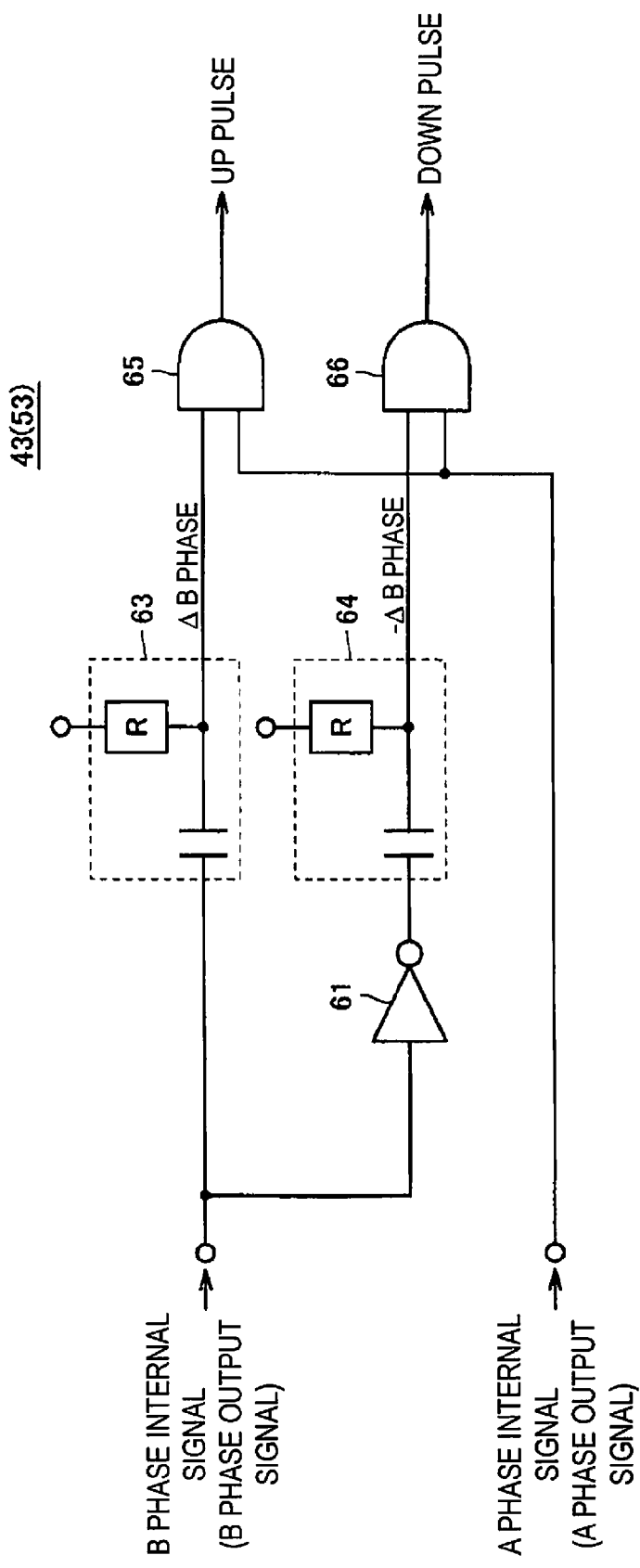
FIG. 4 is a circuit diagram exemplifying a configuration of a direction-discriminating pulsating circuit 43 illustrated in FIG. 2.

FIG. 4 is a circuit diagram exemplifying a configuration of direction-discriminating pulsating circuit 43 illustrated in FIG. 2. With reference to FIG. 4, direction-discriminating pulsating circuit 43 differs in configuration from the one illustrated in FIG. 3 in that inverter 62 is not provided. The other portions of direction-discriminating pulsating circuit 43 are the same as in the configuration of the corresponding portions illustrated in FIG. 3. However, in FIG. 4, the A phase internal signal illustrated in FIG. 3 is replaced with the B phase internal signal and the B phase internal signal illustrated in FIG. 3 is replaced with the A phase internal signal. Differentiating circuit 63 generates a pulse (ΔB phase pulse), which indicates a rising edge of the B phase internal signal. Differentiating circuit 64 generates a pulse (-ΔB phase pulse), which indicates a rising edge of a signal obtained by inverting the B phase internal signal, i.e., a falling edge of the B phase internal signal.

Direction-discriminating pulsating circuit 53 has the same configuration as the one illustrated in FIG. 4. In FIG. 4, the A phase internal signal is replaced with the A phase output signal, and the B phase internal signal is replaced with the B phase output signal.

As described above, each of direction-discriminating pulsating circuits 42 and 52 outputs an up pulse in response to the rising edge of the A phase signal, and outputs the down pulse in response to the falling edge of the A phase signal. Each of direction-discriminating pulsating circuits 43 and 53 outputs the up pulse in response to the rising edge the B phase signal, and outputs the down pulse in response to the falling edge of the B phase signal.

As shown in FIG. 2, each of counters 46, 47, 56 and 57 changes the count value with an increment of +1 each time the counter receives the up pulse or the down pulse. Each counter resets the count value upon receiving a reset signal.

Counter 46 receives the up pulse and the down pulse from direction-discriminating pulsating circuit 42. Counter 46 also receives the reset signal from OR circuit 55.

Counter 47 receives the up pulse and the down pulse from direction-discriminating pulsating circuit 43. Counter 47 also receives the reset signal from OR circuit 54.

Counter 56 receives the up pulse and the down pulse from direction-discriminating pulsating circuit 52. Counter 56 also receives the reset signal from OR circuit 45.

Counter 57 receives the up pulse and the down pulse from direction-discriminating pulsating circuit 53. Counter 57 also receives the reset signal from OR circuit 44.

Each of OR circuits 44, 45, 54, and 55 outputs a result of an OR operation of the up pulse and the down pulse as the reset signal. OR circuit 44 receives the up pulse and the down pulse from direction-discriminating pulsating circuit 42. OR circuit 45 receives the up pulse and the down pulse from direction-discriminating pulsating circuit 43. OR circuit 54 receives the up pulse and the down pulse from direction-discriminating pulsating circuit 52. OR circuit 55 receives the up pulse and the down pulse from direction-discriminating pulsating circuit 53.

The input circuit 51 is connected to the A phase output line 74c and the B phase output line 74e by the A phase input line 74d and the B phase input line 74f. The input circuit 51 receives the A phase output signal and the B phase output signal via the A phase input line 74d and the B phase input line 74f. The input circuit 51 outputs the A phase output signal and the B phase output signal to the direction-discriminating pulsating circuits 52 and 53.

Abnormality detector 50 outputs two error signals each of which indicates the abnormality of encoder 3 when the count value of at least one of counters 46, 47, 56, and 57 reaches a prescribed value. When the diagnostic result of optical block diagnosing unit 21 indicates the abnormality of optical block 20, abnormality detector 50 outputs two error signals to the outside of encoder 3.

Optical block 20 corresponds to a "rotation detector" included in the rotary encoder according an embodiment. Output circuit 37 corresponds to a "signal output unit" included in the rotary encoder according to an embodiment. Comparator 41 corresponds to an "internal signal generator" included in the rotary encoder according to an embodiment. Counters 46 and 47 correspond to a "first counter" and a "second counter" included in the rotary encoder according to an embodiment, respectively, or vice versa. Counters 56 and 57 correspond to a "third counter" and a "fourth counter" included in the rotary encoder according to an embodiment, respectively, or vice versa. Abnormality detector 50 corresponds to an "abnormality detector" included in the rotary encoder according to an embodiment. The input circuit 51 corresponds to an "input circuit" included in the rotary encoder according to an embodiment.

Figure 5:
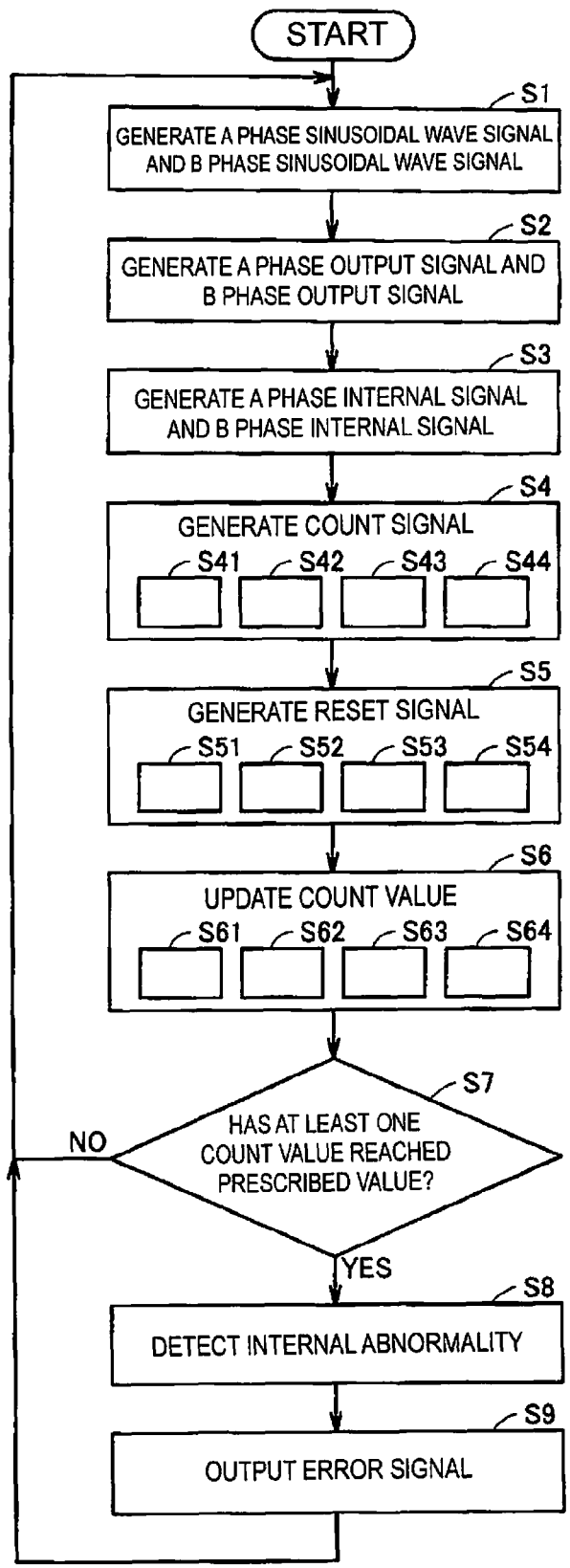
FIG. 5 is a flowchart of a method of detecting an abnormality in the encoder according to the first embodiment.

FIG. 5 is a flowchart of a method for detecting an abnormality in the encoder according to the first embodiment. The flowchart describes the flow of processing that detects an abnormality of the output signal of the encoder. The order in the processing is not limited to that illustrated in FIG. 5. For example, the order of processing may be changed or a plurality of processes in the processing may be performed simultaneously.

With reference to FIG. 5, optical block 20 generates an A phase sinusoidal wave signal and a B phase sinusoidal wave signal in Step S1. In Step S2, signal output unit 22 generates an A phase output signal and a B phase output signal from the A phase sinusoidal wave signal and the B phase sinusoidal wave signal, respectively. In Step S3, output signal diagnosing unit 23 (comparator 41) generates the A phase internal signal and the B phase internal signal. Step S2 and Step S3 may be simultaneously performed.

In Step S4, output signal diagnosing unit 23 generates count signals (an up pulse and a down pulse). Step S4 includes Steps S41 to S44. Steps S41 to Step S44 may be simultaneously performed.

In Step S41, direction-discriminating pulsating circuit 42 generates count signals from the A phase internal signal and the B phase internal signal. In Step S42, direction-discriminating pulsating circuit 43 generates count signals from the A phase internal signal and the B phase internal signal. In Step S43, direction-discriminating pulsating circuit 52 generates count signals from the A phase output signal and the B phase output signal, which have been input via the input circuit 51. In Step S44, direction-discriminating pulsating circuit 53 generates count signals from the A phase output signal and the B phase output signal that have been input via the input circuit 51.

In Step S5, output signal diagnosing unit 23 generates a reset signal. Step S5, which includes Steps S51 to S54. Steps S51 to Step S54 may be simultaneously performed.

In Step S51, OR circuit 44 generates a reset signal from the count signals that were output from direction-discriminating pulsating circuit 42. In Step S52, OR circuit 45 generates a reset signal from the count signals that were output from direction-discriminating pulsating circuit 43. In Step S53, OR circuit 54 generates a reset signal from the count signals that were output from direction-discriminating pulsating circuit 52. In Step S54, OR circuit 55 generates a reset signal from the count signals that were output from direction-discriminating pulsating circuit 53.

In Step S6, output signal diagnosing unit 23 updates the count value. The term "updating" includes setting of the count value, and resetting of the count value. Step S6 includes Steps S61 to S64. Steps S61 to Step S64 are basically simultaneously performed.

In Step S61, counter 46 updates the count value with the count signal and the reset signal. In Step S62, counter 47 updates the count value with the count signal and the reset signal. In Step S63, counter 56 updates the count value with the count signal and the reset signal. In Step S64, counter 57 updates the count value with the count signal and the reset signal.

In Step S7, abnormality detector 50 determines whether at least one of the count values of counters 46, 47, 56, and 57 has reached the prescribed value. When no count value has reached the prescribed value (NO in Step S7), the processing returns to Step S1. On the other hand, when at least one count value has reached the prescribed value (YES in Step S7), the processing proceeds to Step S8.

In Step S8, abnormality detector 50 detects an internal abnormality of encoder 3. The following three abnormalities may be listed as internal abnormalities that can be detected through the above-described processing:

(1) Short-circuit in an output circuit to output an A phase signal and a B phase signal;

(2) Disconnection in the output circuit to output the A phase signal and the B phase signal; and (3) Fixation of the logic of either or both of the A phase signal and the B phase signal at either "H" or "L".

In addition, as described above, the abnormalities of the detection system (for example, un-flashing of the light projecting element) can be detected by optical block diagnosing unit 21.

In Step S9, abnormality detector 50 outputs error signals that indicate the internal abnormality of encoder 3. The error signals are important information that indicate a certain abnormality in encoder 3. Therefore, two error signals are output in the first embodiment. For this reason, two output lines are provided for the error signals. The logic level combination of the two error signals is one of "H, H", "L, L", and "H, L." When Step S9 ends, the processing starting from Step S1 is repeated.

As described above, the abnormalities of the detection system (for example, un-flashing of the light projecting element) can be detected by optical block diagnosing unit 21. Also in this case, abnormality detector 50 outputs two error signals that indicate an internal abnormality of encoder 3.

The user can respond by, for example, stopping a device when these error signals are output. As illustrated in FIG. 1, safety unit 10 may automatically output an STO signal as a stop signal to servo driver 4 when an error signal is output.

Next, a method of detecting abnormalities of the encoder according to the first embodiment will be described in greater detail. Hereinbelow, the method of detecting abnormality of the B phase output signal is exemplified as a method of detecting encoder abnormalities.

Figure 6:
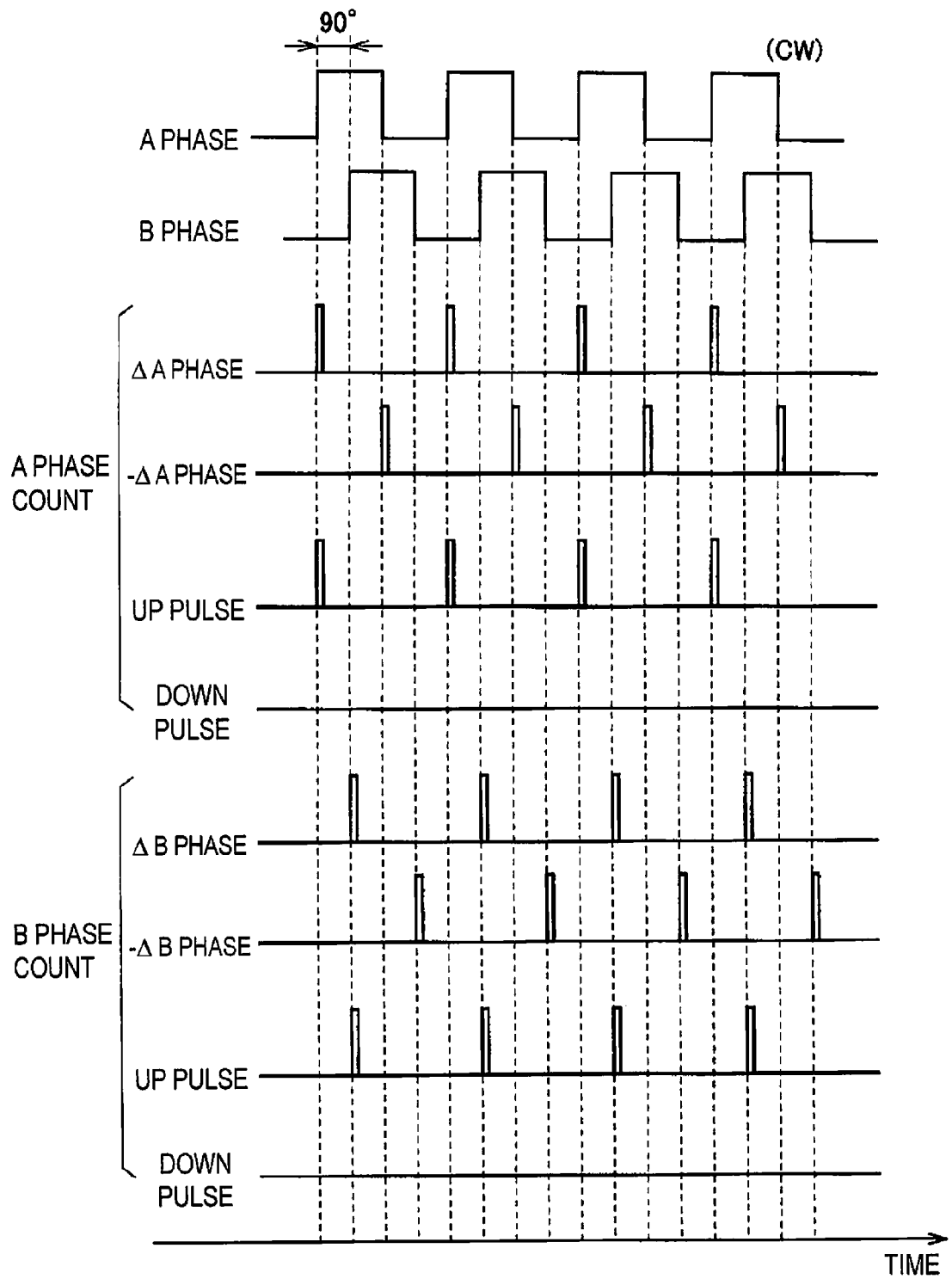
FIG. 6 is a waveform chart for describing operation of the direction-discriminating pulsating circuit when a direction of rotation is clockwise.
Figure 7:
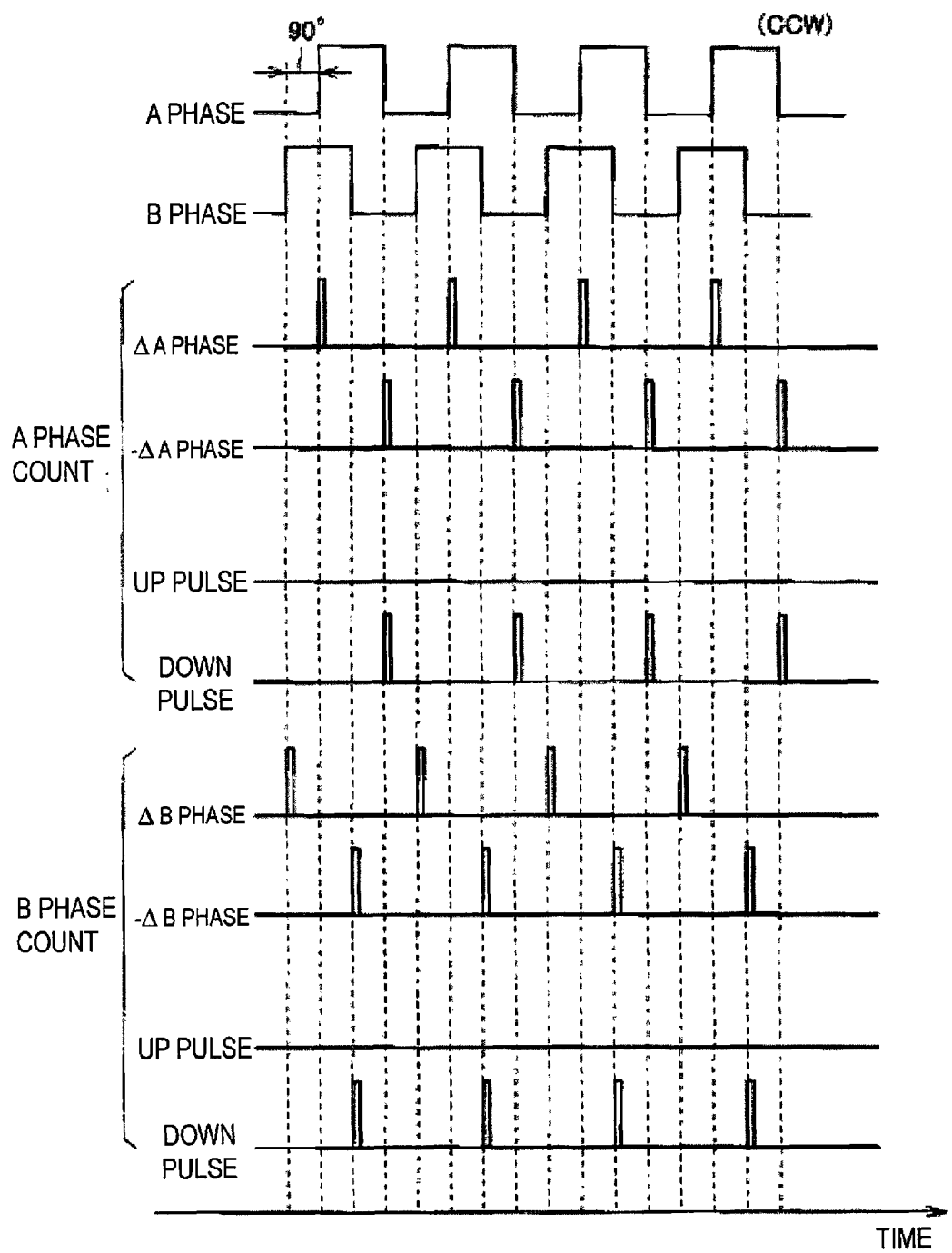
FIG. 7 is a waveform chart for operation of the direction-discriminating pulsating circuit when the direction of rotation is counterclockwise.

FIG. 6 is a waveform chart for describing operation of the direction-discriminating pulsating circuit when a direction of rotation is clockwise. FIG. 7 is a waveform chart for describing operation of the direction-discriminating pulsating circuit when the direction of rotation is counterclockwise.

With reference to FIGS. 6 and 7, each of the "A phase signal" and the "B phase signal" indicates an output signal and an internal signal collectively. In both cases wherein the direction of rotation of an encoder shaft is clockwise (CW) and where the direction of rotation of the encoder shaft is counterclockwise (CCW), the phase difference between the A phase signal and the B phase signal is 90 degrees. In the case of the clockwise direction (CW), the A phase signal is output ahead of the B phase signal. Conversely, when in the counterclockwise direction (CCW), the B phase signal is output ahead of the A phase signal.

Each of direction-discriminating pulsating circuits 42 and 52 generates a ΔA phase pulse at the rising of the A phase signal, and generates a −ΔA phase pulse at the falling of the A phase signal. In the case of the clockwise direction, each of direction-discriminating pulsating circuits 42 and 52 outputs the ΔA phase pulse as the up pulse. In the case of the counterclockwise direction, each of direction-discriminating pulsating circuits 42 and 52 outputs the −ΔA phase pulse as the down pulse. Thus, direction-discriminating pulsating circuits 42 and 52 generate the count signals of the A phase.

Operation of direction-discriminating pulsating circuits 43 and 53 may be the same as the operation of direction-discriminating pulsating circuits 42 and 52 except that the A phase is replaced with the B phase. When in the clockwise direction, each of direction-discriminating pulsating circuits 43 and 53 outputs the ΔB phase pulse as the up pulse. In the case of the counterclockwise direction, each of direction-discriminating pulsating circuits 43 and 53 outputs the −ΔB phase pulse as the down pulse. Thus, direction-discriminating pulsating circuits 43 and 53 generate the count signals of the B phase.

Figure 8:
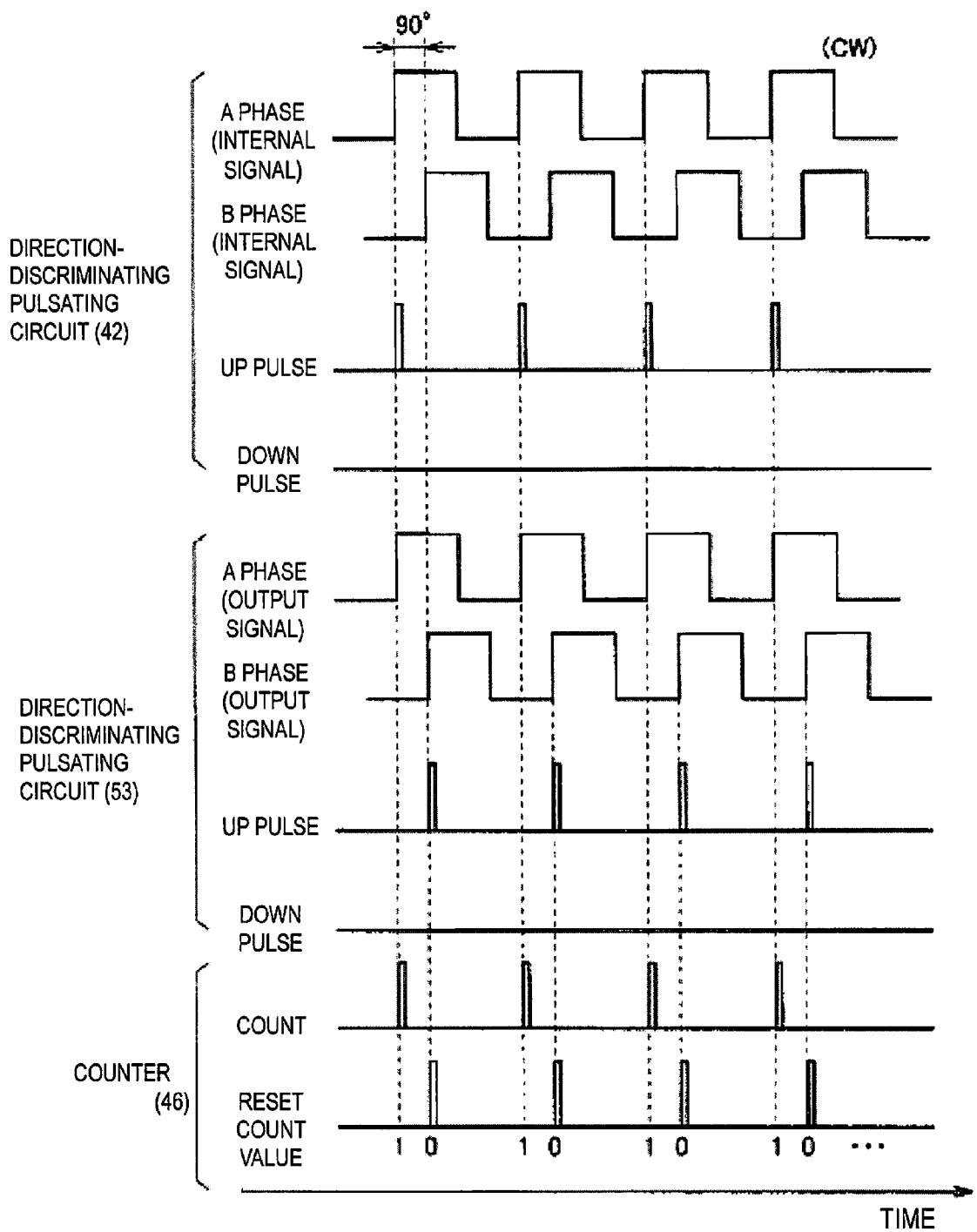
FIG. 8 is a waveform chart for operation of a counter when the direction of rotation is clockwise and an output signal of an encoder 3 is normal.

FIG. 8 is a waveform chart for describing operation of the counter when the direction of rotation is the clockwise direction and the output signal of encoder 3 is normal. With reference to FIGS. 2 and 8, direction-discriminating pulsating circuit 42 receives the A phase internal signal and the B phase internal signal and generates the up pulse at the rising of the A phase internal signal.

Direction-discriminating pulsating circuit 53 receives the A phase output signal and the B phase output signal and generates the up pulse at the rising of the B phase output signal.

OR circuit 55 generates the reset signal using the up pulse output from direction-discriminating pulsating circuit 53. The up pulse output from direction-discriminating pulsating circuit 42 and the reset signal output from OR circuit 55 are alternately input to counter 46. As a result, the count value of counter 46 alternately switches between 0 and 1, like a pattern of 1, 0, 1, 0, and . . . .

Figure 9:
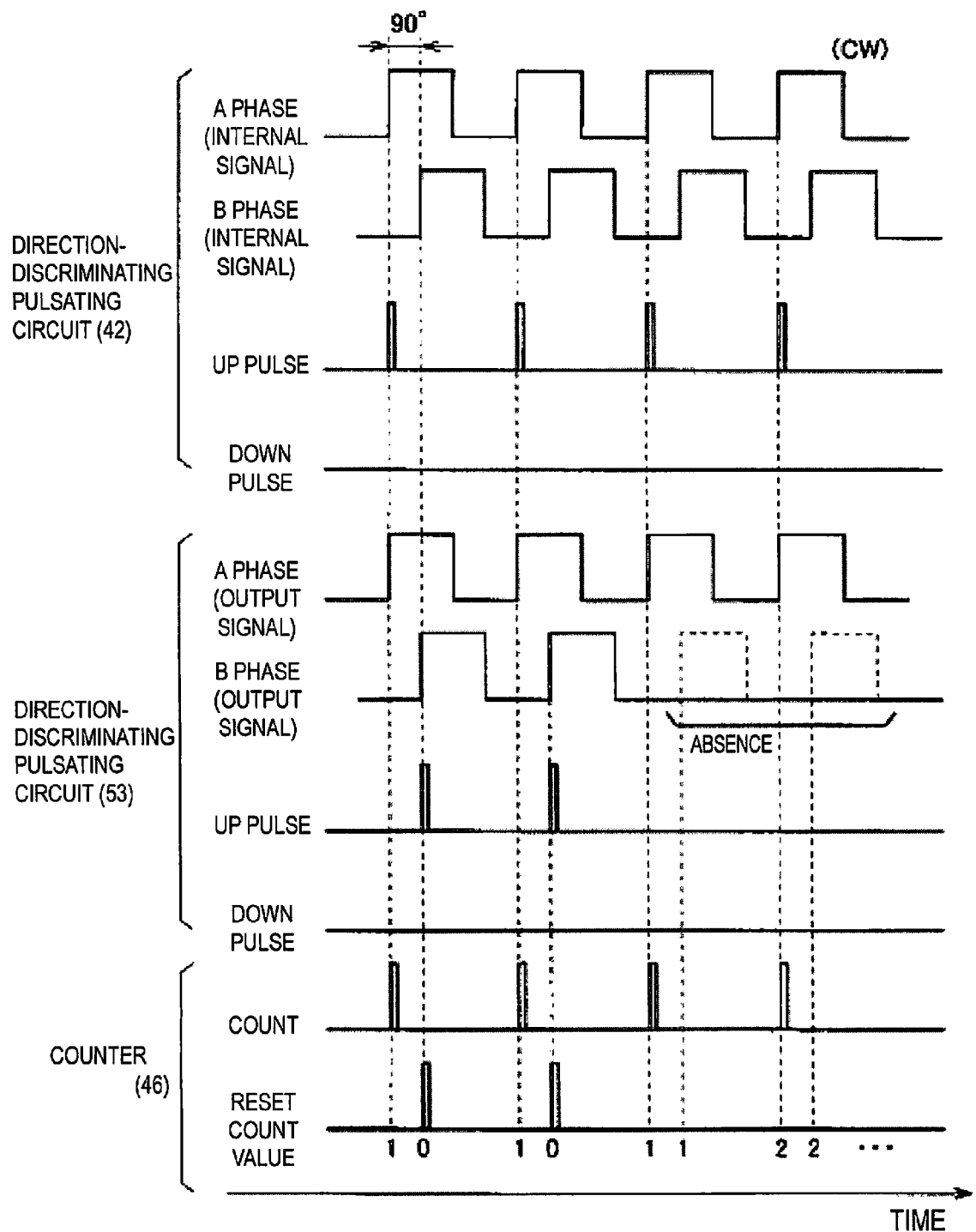
FIG. 9 is a waveform chart for operation of the counter when the direction of rotation is clockwise and a B phase output signal is abnormal.

FIG. 9 is a waveform chart for describing operation of the counter when the direction of rotation is the clockwise direction and the B phase output signal is abnormal. With reference to FIGS. 2 and 9, the B phase output signal is absent due to the abnormality, such as disconnection or short-circuit, in signal output unit 22. In this case, the logic of the B phase output signal is fixed to "L (low)," for example.

Because of the absence of the B phase output signal, the up pulse is no longer output from direction-discriminating pulsating circuit 53 and as a result, the reset signal is not generated. Therefore, the count value increases. At the point in time when the count value reaches a prescribed count value (prescribed value), counter 46 notifies abnormality detector 50 of a carry output. In this way, abnormality detector 50 detects the abnormality and outputs the error signals to the outside.

FIG. 9 illustrates an example in which the abnormality is determined when the count value reaches "2". A value greater than "2" may be set as the prescribed value for determining the abnormality. The prescribed value can be set in consideration of the influence of the interference noise or the like, and the influence of angle of rotation of encoder 3 which is displaced while the abnormality cannot be detected, that is, the influence of the displacement of a device on safety of the work.

Figure 10:
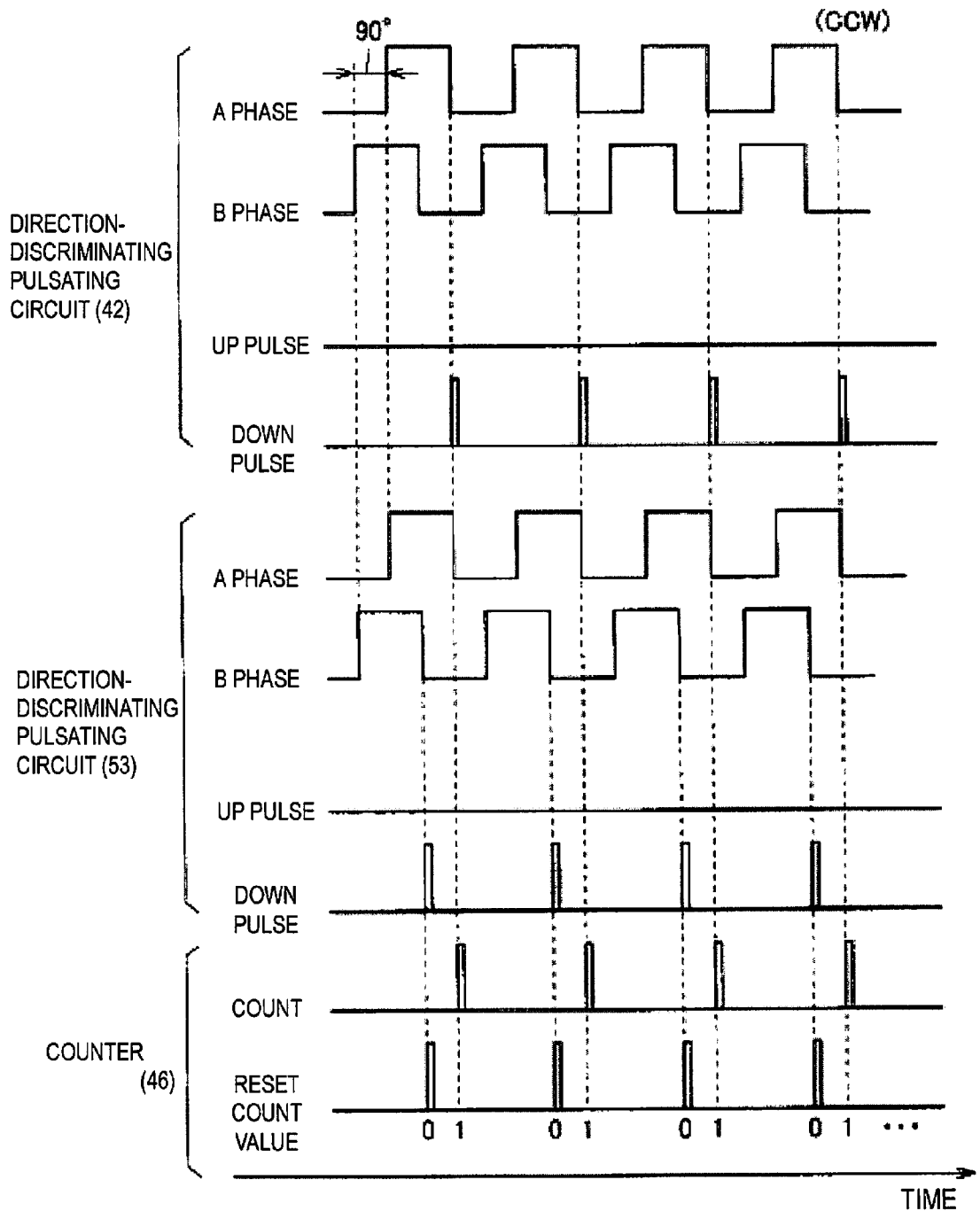
FIG. 10 is a waveform chart for operation of the counter when the direction of rotation is counterclockwise and the output signal of encoder 3 is normal.

FIG. 10 is a waveform chart for describing operation of the counter when the direction of rotation is counterclockwise and the output signal of encoder 3 is normal. With reference to FIG. 10, direction-discriminating pulsating circuit 42 generates the down pulse at the falling of the A phase internal signal. Direction-discriminating pulsating circuit 53 generates the down pulse at the falling of the B phase internal signal.

OR circuit 55 generates the reset signal using the down pulse output from direction-discriminating pulsating circuit 53. Also when the direction of rotation is counterclockwise, the down pulse and the reset signal alternately are input to counter 46. Therefore, the count value of counter 46 alternately switches between 0 and 1, like a pattern of 1, 0, 1, 0, and . . . .

Figure 11:
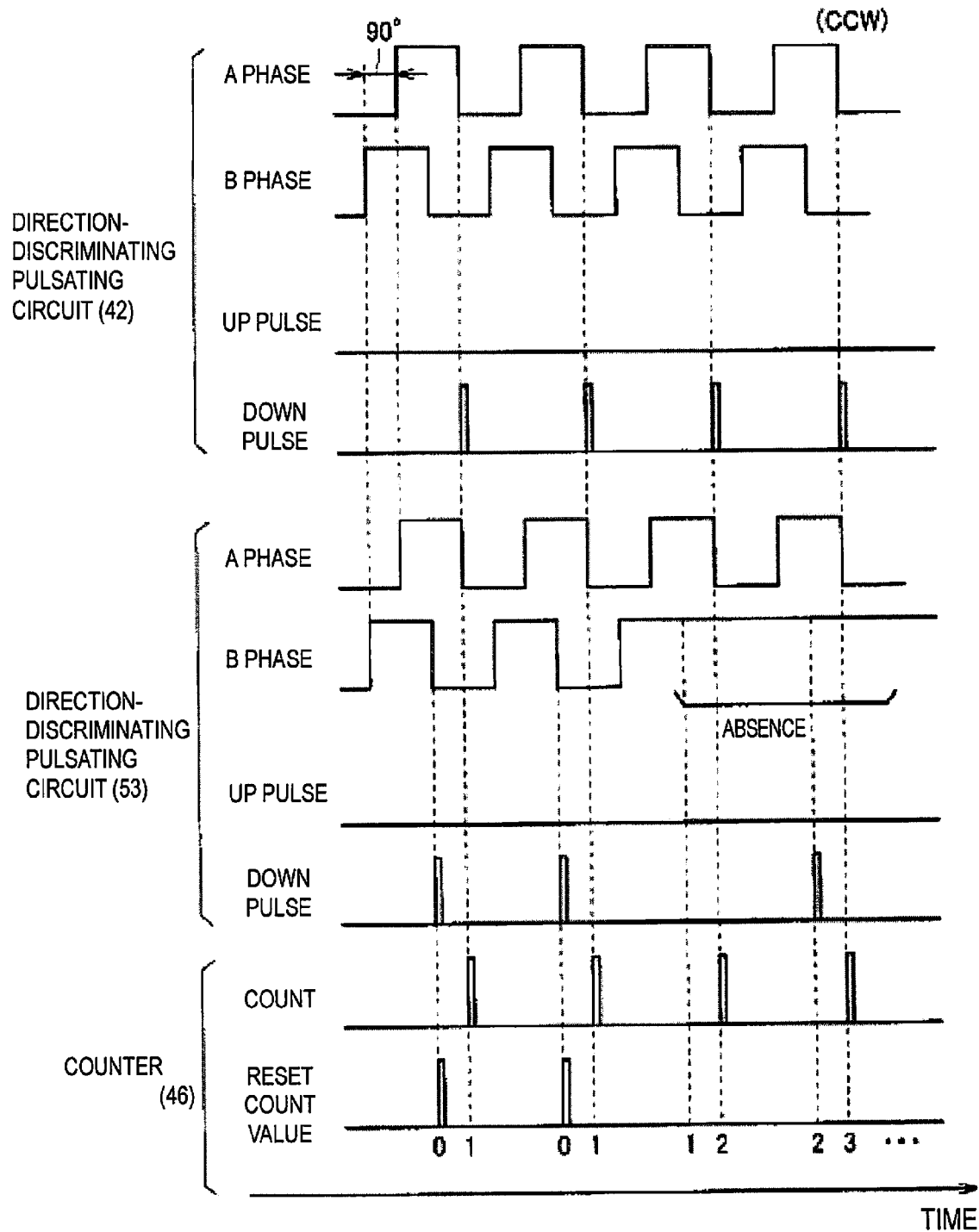
FIG. 11 is a waveform chart for operation of the counter when the direction of rotation is counterclockwise and the B phase output signal is abnormal.

FIG. 11 is a waveform chart for describing operation of the counter when the direction of rotation is the counterclockwise direction and the B phase output signal is abnormal. With reference to FIG. 11, when the B phase output signal is absent, the logic of the B phase output signal is fixed to "H (high)", for example. Even in this case, because the down pulse is no longer output from direction-discriminating pulsating circuit 53, the reset signal is not generated. Because the reset signal is not generated, the count value increases. At the point in time when the count value reaches a prescribed count value (prescribed value), counter 46 notifies abnormality detector 50 of a carry output. In this way, abnormality detector 50 detects the abnormality and outputs the error signals to the outside.

In addition, in FIG. 9, because of the absence of the B phase output signal, the logic of the B phase output signal is likely to be fixed to "H." Similarly, in FIG. 11, because of the absence of the B phase output signal, the logic of the B phase output signal is likely to be fixed to "L." Even in these cases, the reset signal is not generated either. Therefore, the count value of counter 46 reaches the prescribed value. In this way, abnormality detector 50 detects the abnormality and outputs the error signals to the outside.

Accordingly, counter 46 sets the count value in response to the rising or falling of the A phase internal signal, and resets the count value in response to the rising or falling of the B phase output signal. Thereby, the abnormality of the B phase output signal is detectable.

Operation of counter 47 is the same as the operation illustrated in FIGS. 8 to 11. Thus, counter 47 sets the count value in response to the rising or falling of the B phase internal signal, and resets the count value in response to the rising or falling of the A phase output signal. Thereby, the abnormality of the A phase output signal is detectable.

An important point is that the count value of the counter is set using a signal of either one phase and the count value is reset using a signal of the other phase. For example, in counters 46 and 47, suppose that setting and resetting of a count value is performed using an internal signal and an output signal of the same phase. The internal signal and the output signal are input to the counter almost simultaneously. Supposing that the count value is not reset when the internal signal and the output signal are simultaneously input to the counter, there is likelihood that the count value cannot be reset if the internal signal and the output signal of the same phase are used. On the other hand, because of a phase difference between the A phase and the B phase, the timing of rising or falling certainly differs between the A phase and the B phase. Thus, the counter certainly performs either setting or resetting of the count value. Therefore, the non-resettable problem can be avoided.

When the abnormalities occur to the A phase internal signal or the B phase internal signal (for example, the logic is fixed to "H" or "L"), the count value of counter 46 is not settable. In addition, when the abnormalities occur to the B phase output signal, the count value of counter 46 is not resettable. Therefore, the carry output from counter 46 does not occur. That is, abnormality detector 50 cannot detect the abnormality of the internal signals only with the outputs of counters 46 and 47.

Therefore, in the first embodiment, encoder 3 is provided with counters 56 and 57. Operation of counters 56 and 57 may be the same as that of counters 46 and 47, respectively. Counters 56 and 57 differ from the counters 46 and 47 in that the count values are set in response to the rising or falling of the output signals in the embodiment. The count values are reset in response to the rising or falling of the internal signals.

FIG. 12 is a diagram illustrating a tabular form indicating signals for generating the count signal and the reset signal of each counter, and the kinds of abnormalities detectable by each counter. With reference to FIG. 12, in the first embodiment, the reset signal is generated in response to an edge of a pulse (namely, rising or falling of a pulse) of a signal whose abnormality is to be detected. Therefore, the abnormality of the signal to be detected can be detected by the counter that receives the reset signal.

In addition, a possibility that both of two output signals are simultaneously abnormal, or a possibility that both of two internal signals are simultaneously abnormal can be considered. According to the first embodiment, these abnormalities can be detected by a combination of two counters.

For example, in publicly known technologies, abnormality detection is performed by comparing the A phase output signal and the B phase output signal output from the encoder. In the detecting method, when the logic of one signal alternately repeatedly switches between an "H" state and an "L" state but the logic of the other signal does not switch but stays at "H" or "L", an abnormal encoder is detected. However, according to this method, when both of the A phase output signal and the B phase output signal are abnormal, and as a result, when both are fixed to an "H" state or an "L" state, the abnormality cannot be detected. On the other hand, according to the first embodiment, the abnormalities can be detected when both of the two output signals become abnormal or both of the two internal signals have become abnormal.

Figure 13:
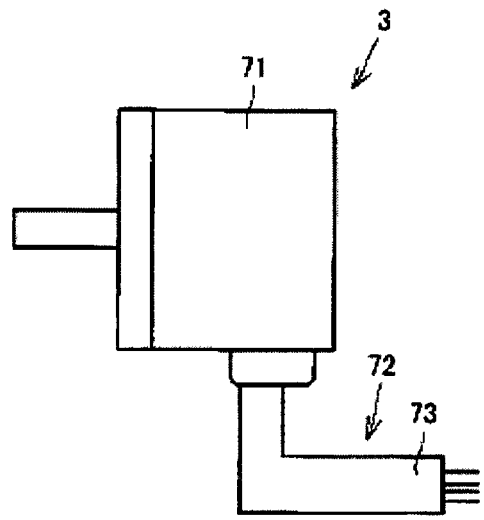
FIG. 13 is a schematic diagram of an external form of a rotary encoder according to the first embodiment.
Figure 14:
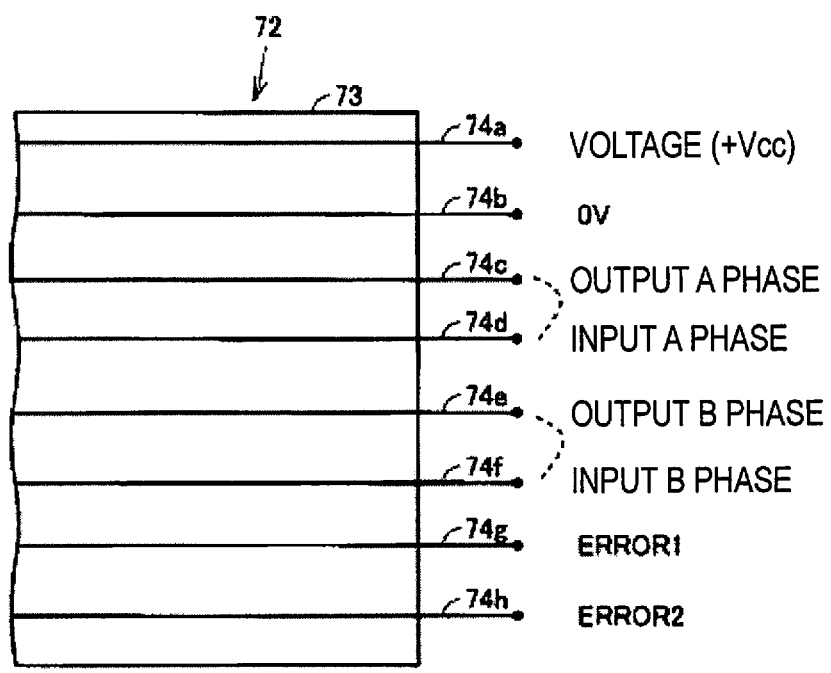
FIG. 14 is a schematic cross-sectional view of an input/output cable of the rotary encoder.

FIG. 13 is a schematic diagram of an external form of a rotary encoder according to the first embodiment. FIG. 14 is a schematic cross-sectional view of an input/output cable of the rotary encoder. With reference to FIGS. 13 and 14, encoder 3 includes a housing 71 and a cable 72. Housing 71 encases optical block 20, optical block diagnosing unit 21, signal output unit 22, output signal diagnosing unit 23, and abnormality detector 50 which are illustrated in FIG. 2.

Cable 72 includes power supply line 74a, grounding line 74b, A phase output line 74c, A phase input line 74d, B phase output line 74e, B phase input line 74f, error signal lines 74g and 74h, and outer covers 73 that cover those lines.

With reference to FIGS. 2 and 14, power supply line 74a and grounding line 74b supply voltage (+Vcc) to each of the blocks. A phase output line 74c and B phase output line 74e are lines for outputting each of the A phase output signal and the B phase output signal to the outside of encoder 3 from output circuit 37. A phase input line 74d and B phase input line 74f are lines for inputting each of the A phase output signal and the B phase output signal to input circuit 51 of encoder 3. Error signal lines 74g and 74h output each of the two error signals (ERROR1 and ERROR2) to the outside of encoder 3 from abnormality detector 50. For example, when connecting encoder 3 to the latter-stage equipment, A phase input line 74d and B phase input line 74f are short-circuited with A phase output line 74c and B phase output line 74e, respectively.

In this way, according to the first embodiment, abnormality detection is performed in the encoder. The encoder outputs error signals when abnormalities occur. The user can know, with the error signal, whether there is an abnormality in information generated based on the rectangular wave output signal of the encoder. Therefore, the user does not need to particularly build a means for detecting the abnormality of the encoder. The user can take measures, such as stopping a device when a certain abnormality occurs in the encoder, using the error signals. In this way, the first embodiment provides enhanced user convenience.

In addition, in the first embodiment, the output signal of the encoder is a rectangular wave signal. Furthermore, the first embodiment can use a conventional output system, such as an open collector output, a voltage output, a line driver output, and/or a complimentary output. For this reason, the encoder according to the first embodiment can be suitably and easily applied to existing devices or systems. This latter feature further provides an encoder with enhanced user convenience.

Second Embodiment

According to the first embodiment, the input line and the output line are provided for each of the A phase output signal and the B phase output signal. For this reason, there is the work that the user has to do in order to short-circuit the input line with the output line. A second embodiment provides a configuration that avoids such work.

Figure 15:
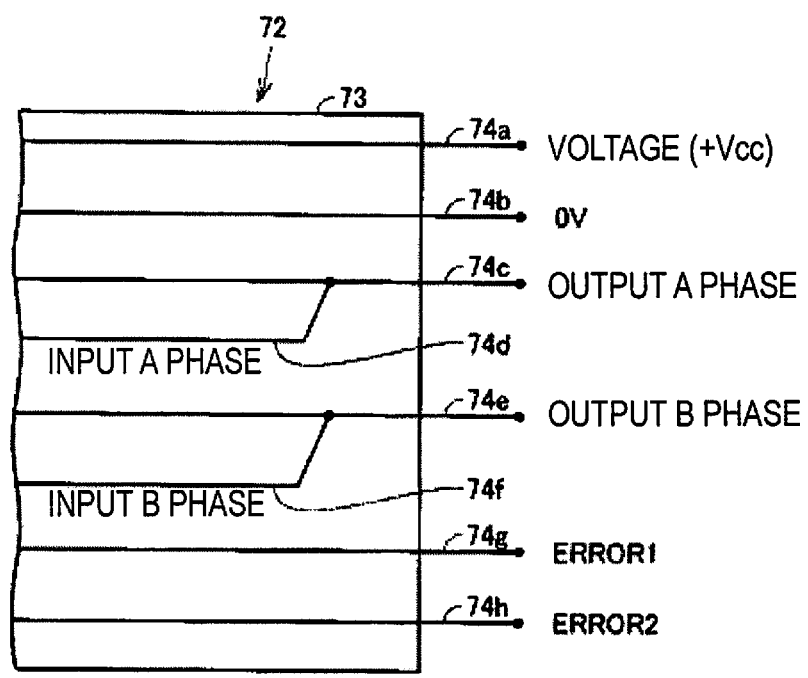
FIG. 15 is a schematic cross-sectional view of an input/output cable of a rotary encoder according to a second embodiment.

FIG. 15 is a schematic cross-sectional view of an input/output cable of the rotary encoder according to the second embodiment. With reference to FIG. 15, A phase input line 74d and B phase input line 74f are short-circuited with A phase output line 74c and B phase output line 74e, respectively in cable 72 (i.e., in an interior space of outer cover 73), especially at a terminal portion of cable 72. This provides enhanced user convenience.

Figure 16:
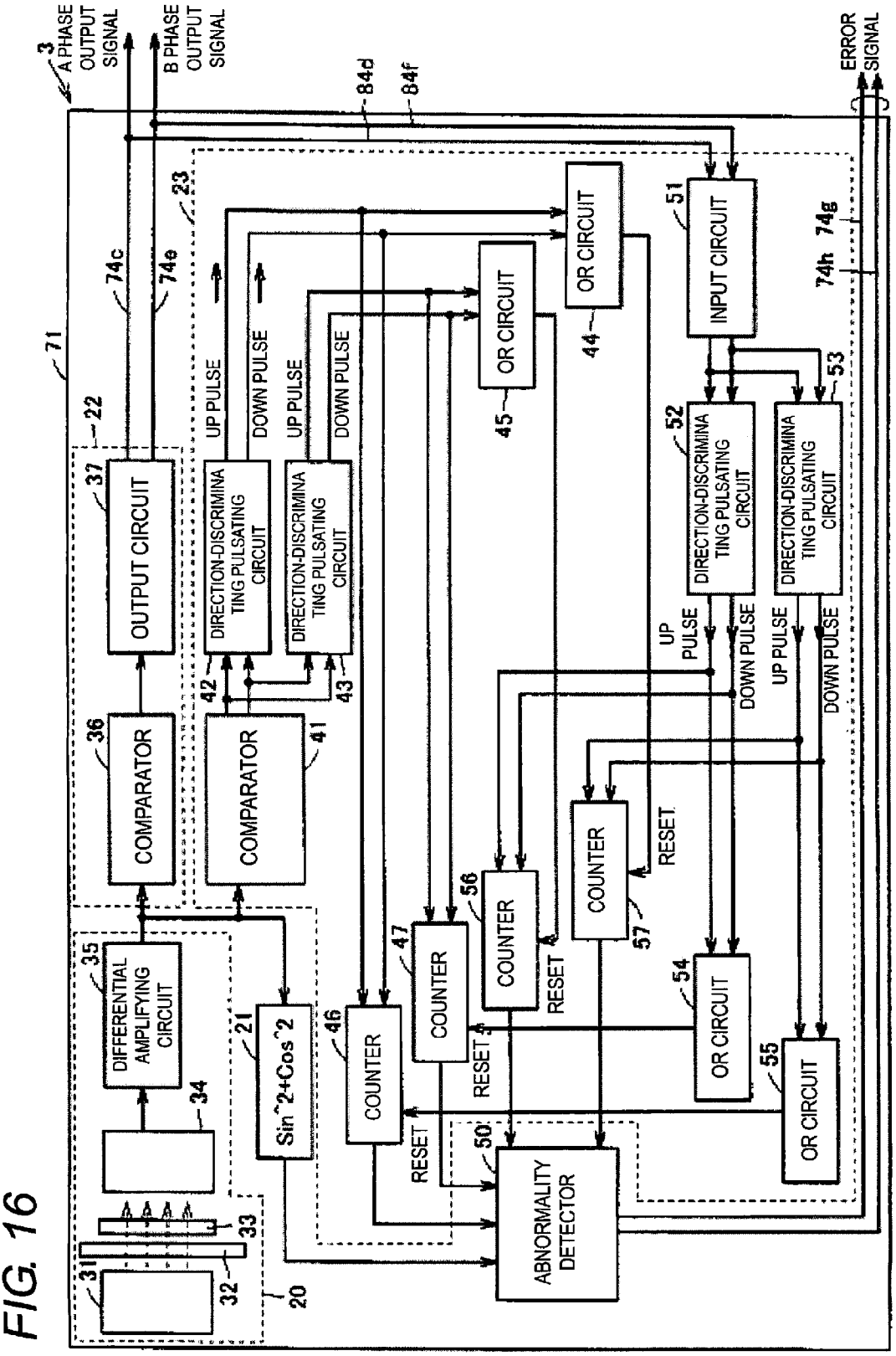
FIG. 16 illustrates another example of the configuration of the rotary encoder according to the second embodiment.

FIG. 16 is a diagram illustrating another example of a configuration of the rotary encoder according to the second embodiment. With reference to FIG. 16, signal paths 84d and 84f are provided in the inside of housing 71 of encoder 3. For example, the signal paths 84d and 84f are wirings formed in a circuit board to which a signal output unit 22 and an output signal diagnosing unit 23 are mounted. The signal path 84d is connected to the A phase output line 74c so as to guide the A phase output signal which is output from an output circuit 37 of signal output unit 22 to an input circuit 51. The signal path 84f is connected to the B phase output line 74e so as to guide the B phase output signal which is output from output circuit 37 of signal output unit 22 to the input circuit 51.

When there is a construction environment protected by protection members, such as a cable duct, a possibility of disconnection or short-circuit in the output circuit can be eliminated. In this case, the abnormality of the A phase output signal and the B phase output signal may reflect only internal abnormalities of encoder 3 (for example, abnormalities of output circuit 37). Therefore, the configuration illustrated in FIG. 16 can be employed.

The configuration of other portions of the encoder according to the second embodiment is the same as the configuration of the corresponding portions of the encoder according to the first embodiment.

Thus, according to the second embodiment, the user's convenience can further be improved over the first embodiment.

Third Embodiment

According to a third embodiment, detection of an A phase internal signal and a B phase internal signal is not necessary. In this point, the third embodiment differs from the first embodiment.

Figure 17:
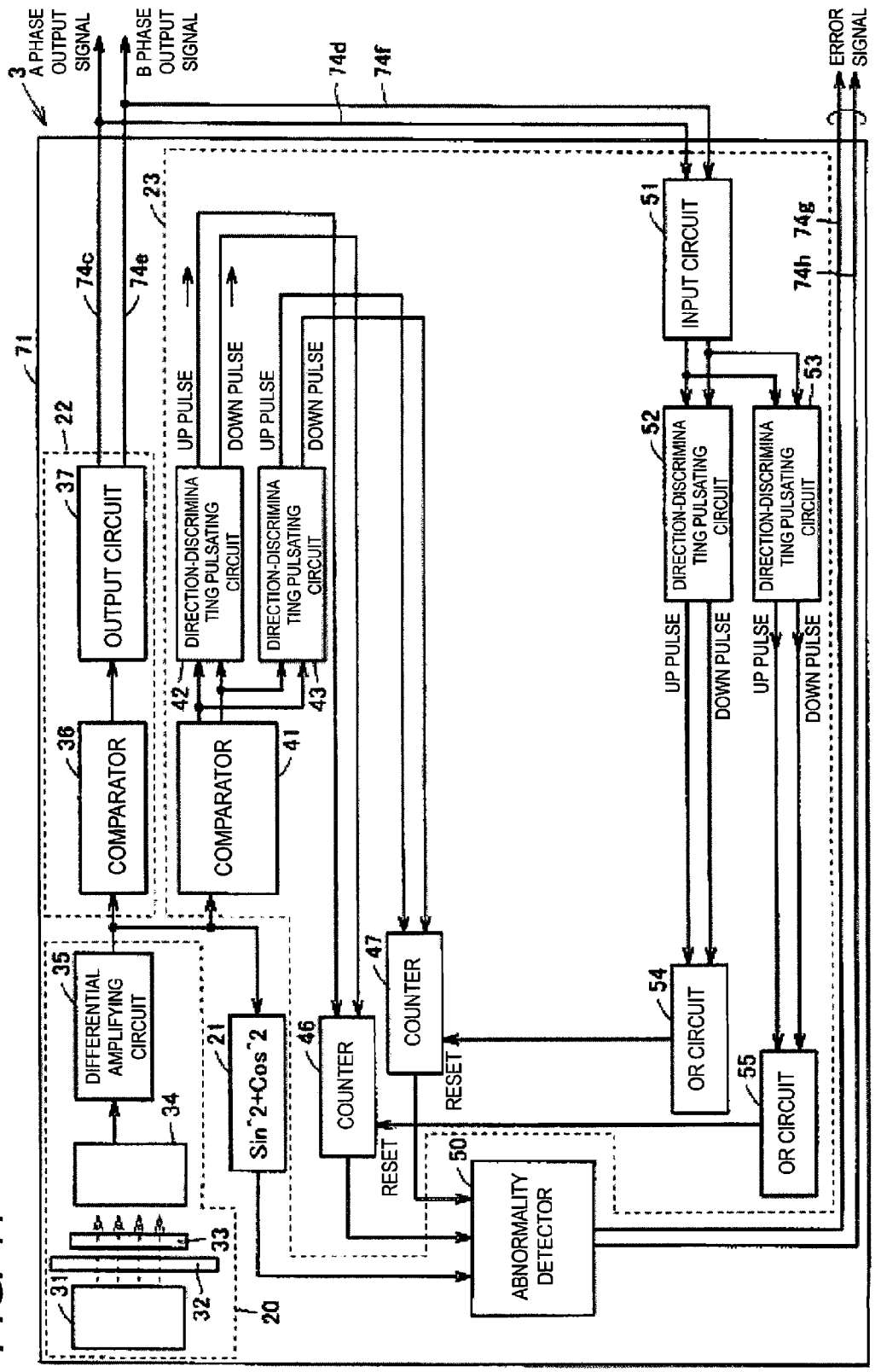
FIG. 17 is a diagram that exemplifies a configuration of a rotary encoder according to a third embodiment.

FIG. 17 is a diagram illustrating an example of a configuration of a rotary encoder according to the third embodiment. With reference to FIGS. 2 and 17, the rotary encoder according to the third embodiment differs from the rotary encoder according to the first embodiment in that OR circuits 44 and 45 and counters 56 and 57 are not provided. The configuration of other portions of the rotary encoder according to the third embodiment is the same as the configuration of the corresponding portions of the rotary encoder according to the first embodiment.

For example, as for the failure rate of parts that constitute a circuit, the probability of occurrence of one abnormality may be quite low. In such case, a device likely has very little influence on a worker at the time of the abnormality. Alternatively, a maintenance system may be provided that can detect encoder abnormalities with periodic inspection of output signals. In such case, the function of detecting the abnormality of the A phase internal signal and the B phase internal signal can be eliminated.

According to the third embodiment, because the function of detecting the abnormality of the A phase internal signal and the B phase internal signal can be eliminated, the encoder can be reduced in size. The size reduction of the encoder also allows cost reduction.

Fourth Embodiment

According to a fourth embodiment, an encoder has a configuration that can detect short-circuiting of an A phase output signal and a B phase output signal. The configuration described below is combinable with any of the first to third embodiments.

The short-circuit abnormality is one of patterns in which both of the A phase output signal and the B phase output signal are simultaneously abnormal. According to the first embodiment, it is assumed that both of the A phase output signal and the B phase output signal are simultaneously short-circuited, or the signal lines are disconnected. According to the fourth embodiment, it is assumed that both of the A phase output signal and the B phase output signal are short-circuited.

Figure 18:
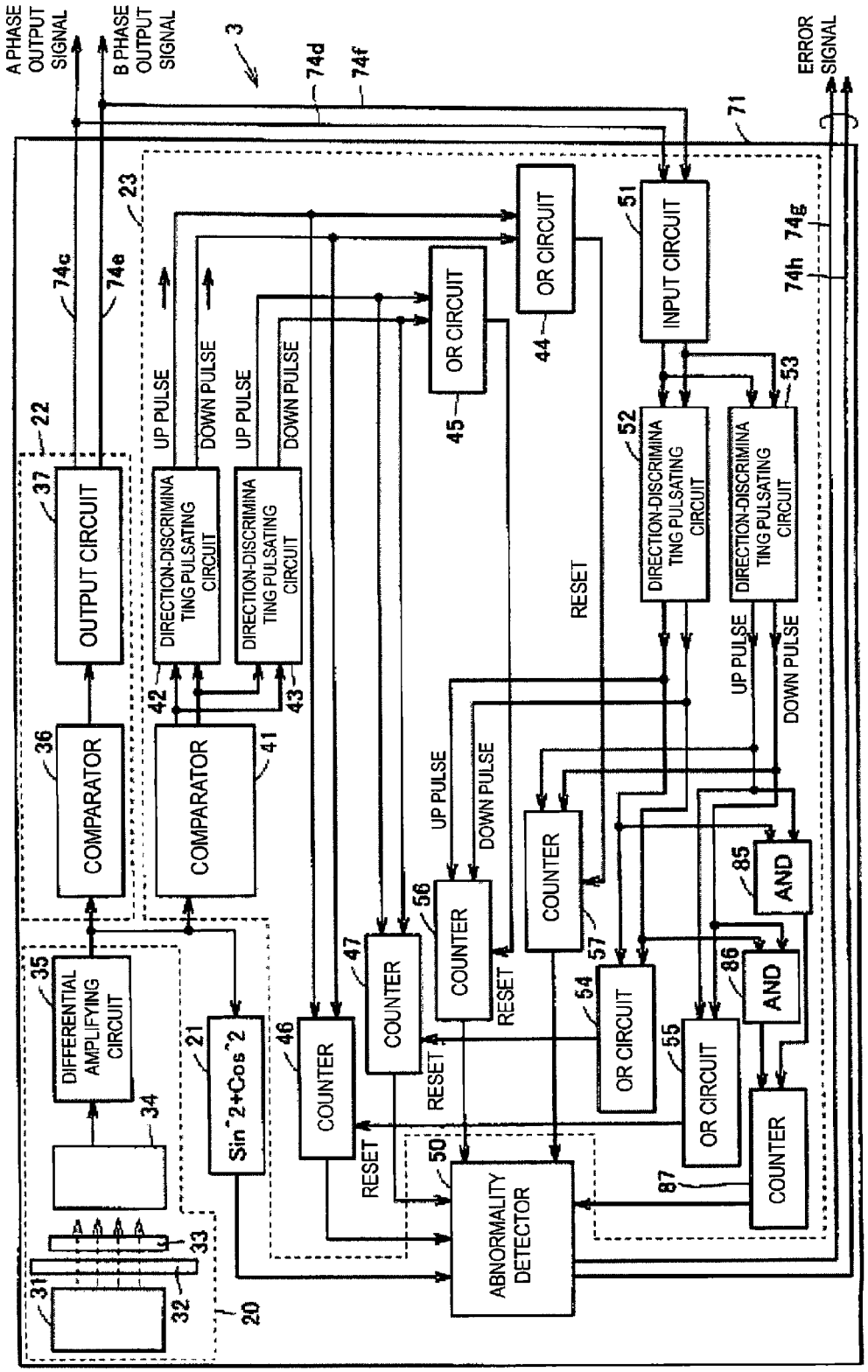
FIG. 18 is a diagram that exemplifies a configuration of a rotary encoder according to a fourth embodiment.

FIG. 18 is a diagram exemplifying a configuration of a rotary encoder according to the fourth embodiment. With reference to FIGS. 2 and 18, the rotary encoder according to the fourth embodiment differs from the rotary encoder according to the first embodiment in that AND circuits 85 and 86 and counter 87 are additionally provided. The configuration of other portions of the rotary encoder according to the fourth embodiment is the same as the configuration of the corresponding portions of the rotary encoder according to the first embodiment.

AND circuit 85 generates an output of an AND operation of an up pulse of direction-discriminating pulsating circuit 52, and an up pulse of direction-discriminating pulsating circuit 53. The output of AND circuit 85 is an up pulse for counter 87. AND circuit 86 generates an output of an AND operation of a down pulse of direction-discriminating pulsating circuit 52 and a down pulse of direction-discriminating pulsating circuit 53. The output of AND circuit 86 is a down pulse for counter 87. Because the configuration of the direction-discriminating pulsating circuits 52 and 53 is the same as the configuration illustrated in FIGS. 3 and 4, description thereof is not repeated here. Counter 87 sets a count value based on the up pulse output from AND circuit 85 or the down pulse output from AND circuit 86. Counter 87 corresponds to a "short-circuit detecting counter." The count value of counter 87 corresponds to a "count value for short-circuit detection."

Figure 19:
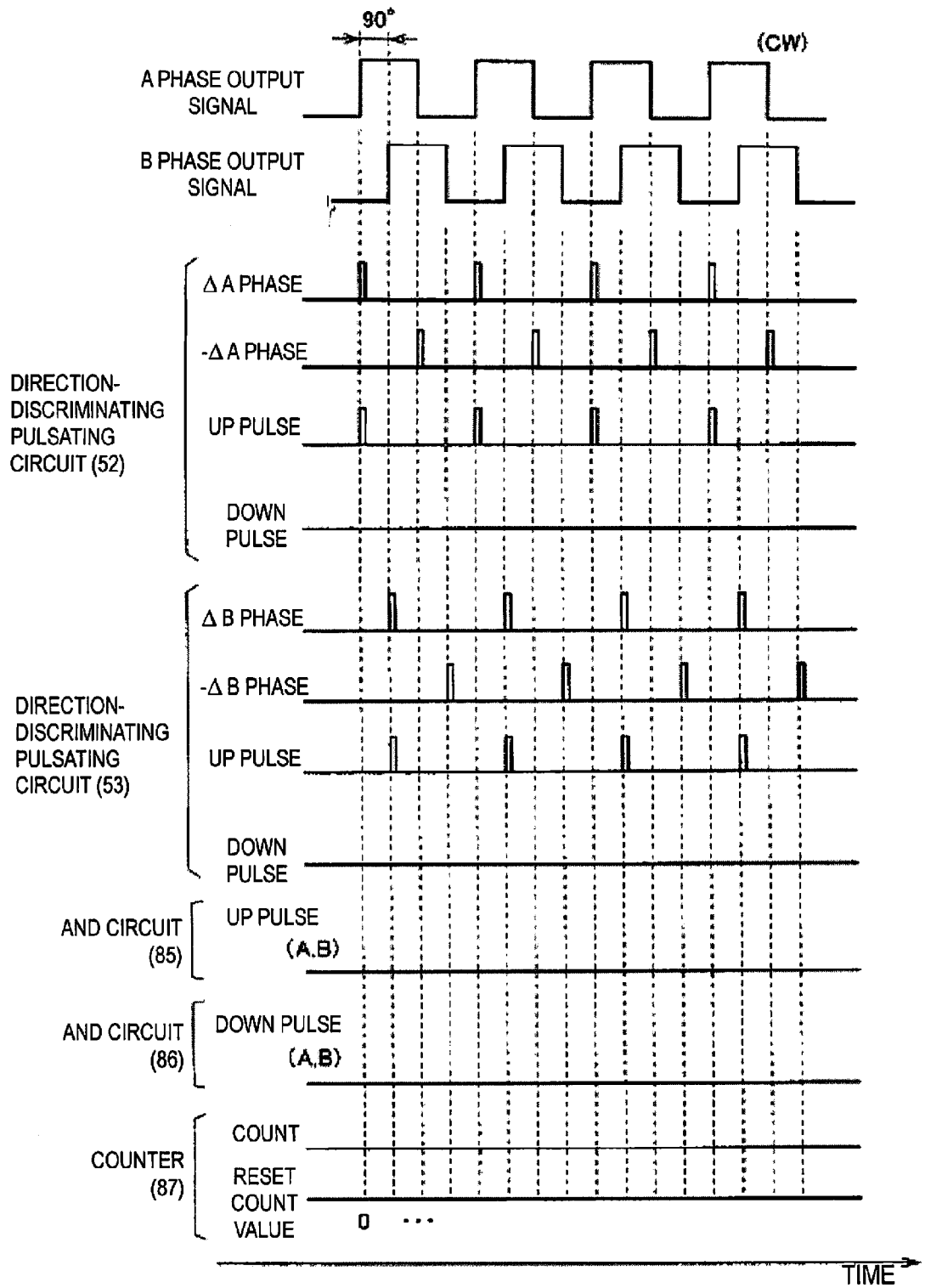
FIG. 19 is a waveform chart of a counter 87 when the direction of rotation is clockwise and the output signal of encoder 3 is normal.
Figure 20:
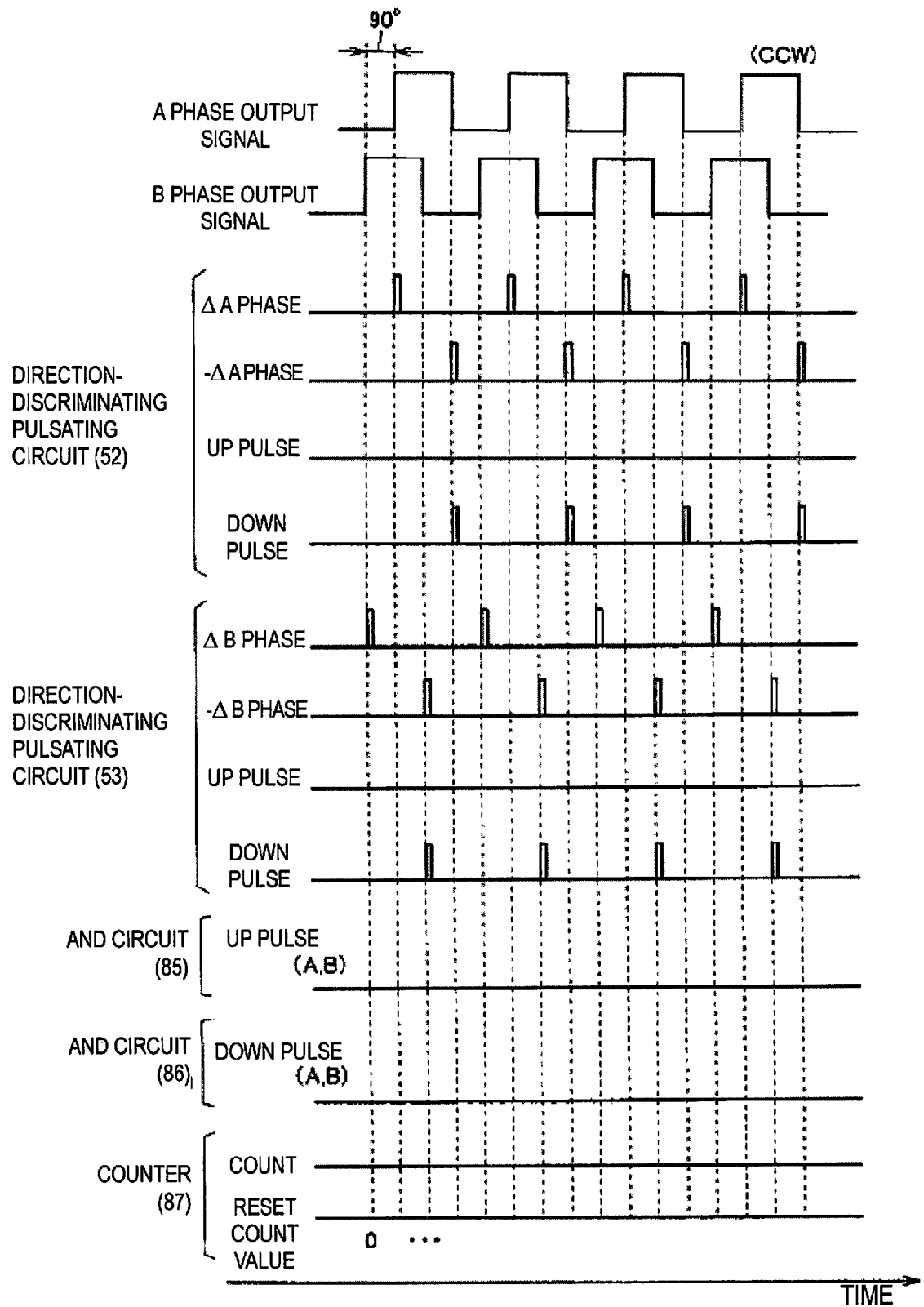
FIG. 20 is a waveform chart of the counter 87 when the direction of rotation is counterclockwise and the output signal of encoder 3 is normal.

Normal operation of the encoder according to the fourth embodiment will now be described with reference to FIGS. 19 and 20. FIG. 19 is a waveform chart for describing operation of counter 87 when a direction of rotation is a clockwise direction and an output signal of encoder 3 is normal. FIG. 20 is a waveform chart for describing operation of counter 87 when the direction of rotation is a counterclockwise direction and the output signal of encoder 3 is normal.

As illustrated in FIG. 19, direction-discriminating pulsating circuit 52 generates the up pulse in synchronization with a rising A phase output signal. Direction-discriminating pulsating circuit 53 generates the up pulse in synchronization with a rising B phase output signal. When normal, the timing of up pulse generation differs between direction-discriminating pulsating circuit 52 and direction-discriminating pulsating circuit 53. Therefore, a signal is not output from AND circuit 85.

Similarly, as illustrated in FIG. 20, direction-discriminating pulsating circuit 52 generates the down pulse in synchronization with a falling A phase output signal. Direction-discriminating pulsating circuit 53 generates the down pulse in synchronization with a falling B phase output signal. When normal, the generation time of the down pulse differs between direction-discriminating pulsating circuit 52 and direction-discriminating pulsating circuit 53. Therefore, a signal is not output from AND circuit 86.

Because neither of AND circuits 85 and 86 outputs a signal, a count value of counter 87 is 0 and is unchanged. According to the configuration illustrated in FIG. 18, a reset signal is not input to counter 87. Therefore, it is preferable to perform an operation that clears the count value of counter 87 by turning off a power supply of a main body of encoder 3.

Figure 21A:
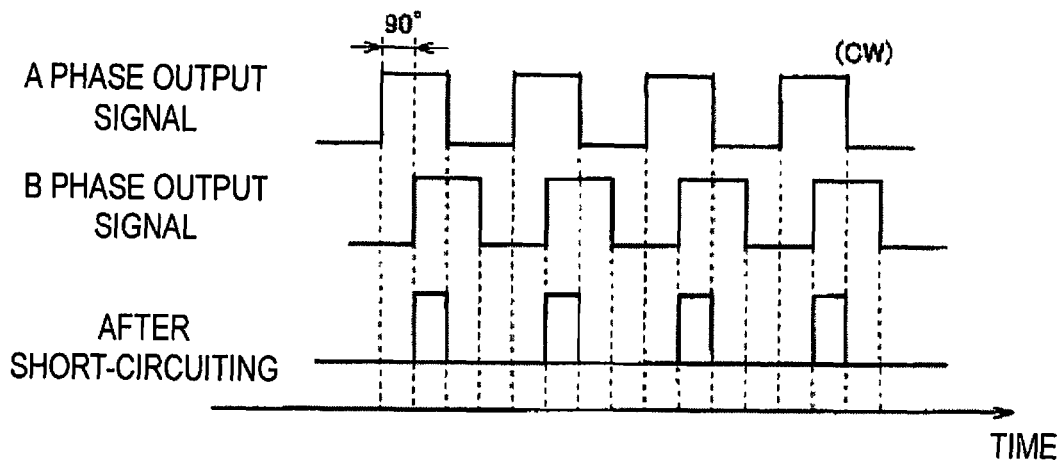
FIGS. 21A and 21B are waveform charts describing a signal generated when an A phase output signal and a B phase output signal are short-circuited.
Figure 21B:
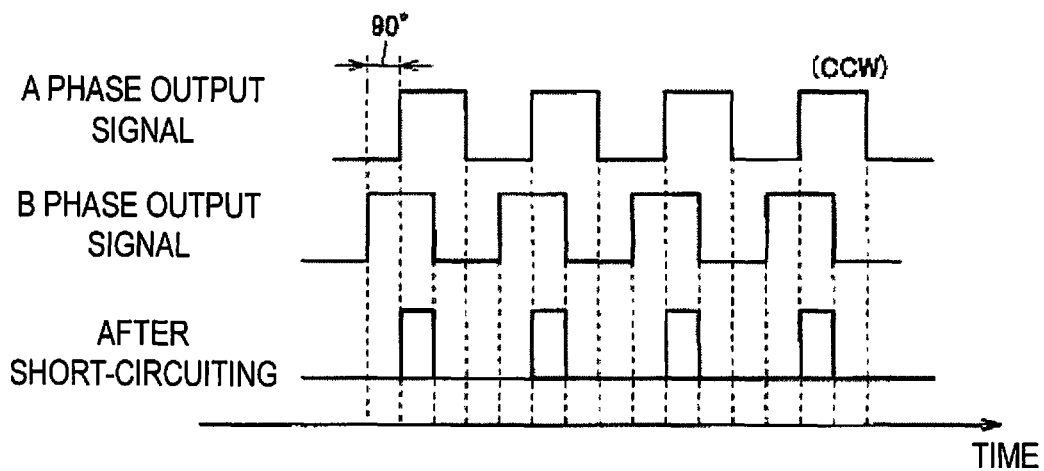

FIGS. 21A and 21B are waveform charts describing a signal that is generated when the A phase output signal and the B phase output signal are short-circuited. FIG. 21A illustrates a signal waveform after short-circuiting occurs when the direction of rotation is clockwise.

FIG. 21B illustrates a signal waveform after short-circuiting occurs when the direction of rotation is counterclockwise. With reference to FIGS. 21A and 21B, because the A phase output signal and the B phase output signal are short-circuited, the levels of both signals become the same. The waveform after being short-circuited represents an output of an AND operation of the A phase output signal and the B phase output signal.

Figure 22:
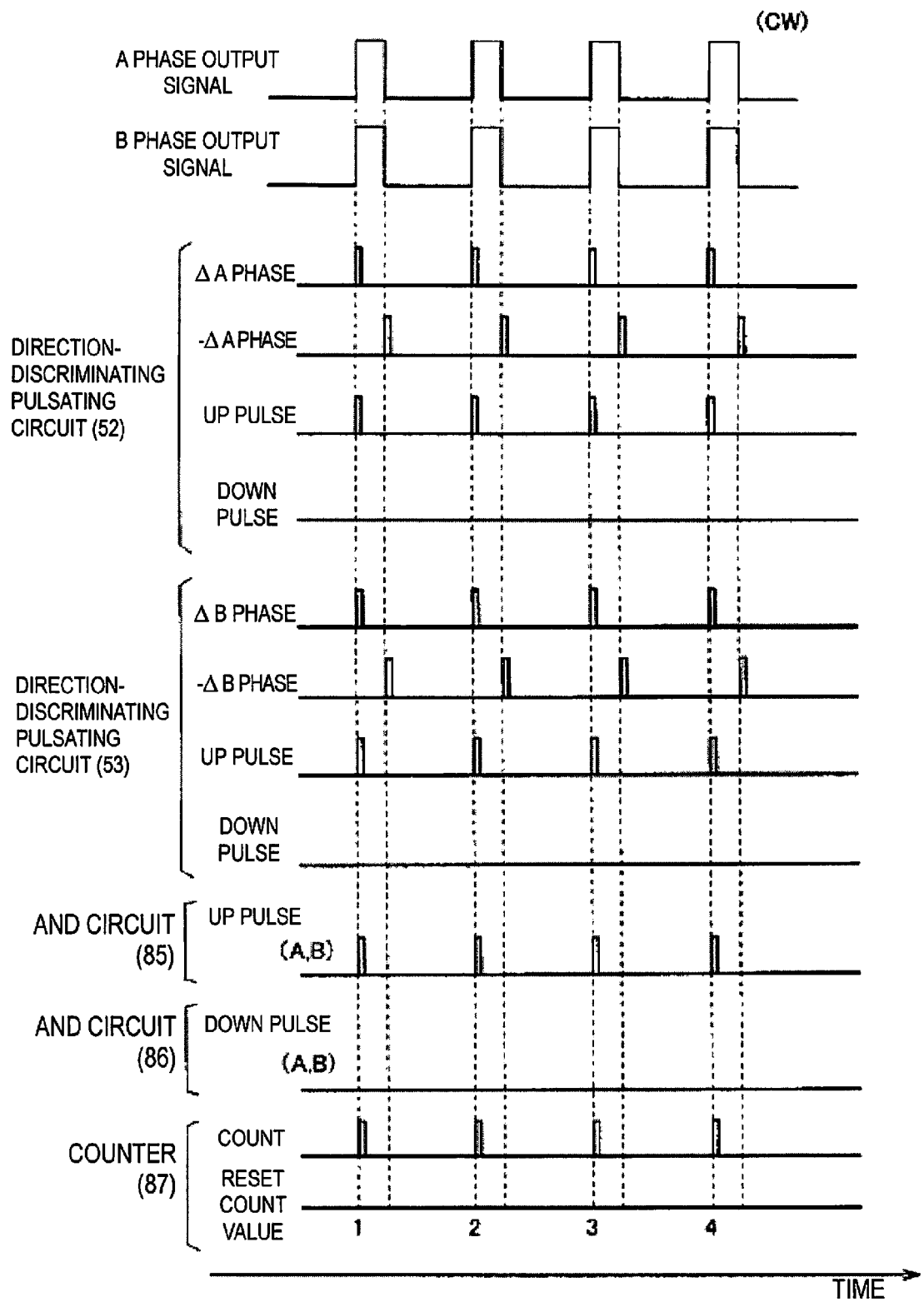
FIG. 22 is a waveform chart describing operation of counter 87 when the direction of rotation is clockwise, and the A phase output signal and the B phase output signal are short-circuited.
Figure 23:
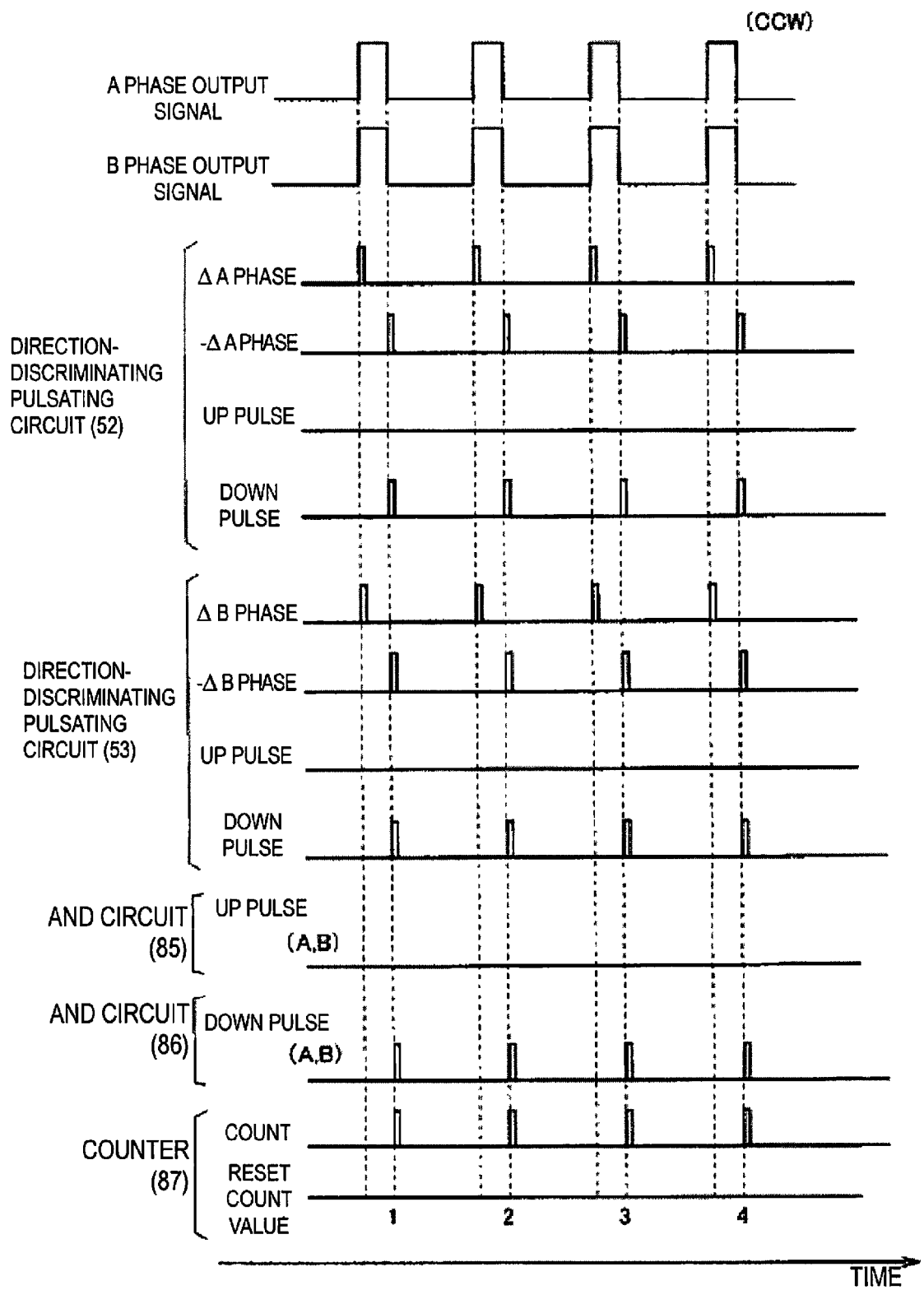
FIG. 23 is a waveform chart describing operation of counter 87 when the direction of rotation is counterclockwise, and the A phase output signal and the B phase output signal are short-circuited.

FIG. 22 is a waveform chart describing operation of counter 87 rotation is clockwise and the A phase output signal and the B phase output signal are short-circuited with each other. FIG. 23 is a waveform chart describing operation of counter 87 when rotation is counterclockwise and the A phase output signal and the B phase output signal are short-circuited with each other.

As illustrated in FIG. 22, when the A phase output signal and the B phase output signal are short-circuited with each other, the up pulse (which is synchronized with the rising of the A phase output signal) generated by direction-discriminating pulsating circuit 52 and the up pulse (which is synchronized with the rising of the B phase output signal) generated by direction-discriminating pulsating circuit 53 are generated with the same timing. For this reason, a signal (up pulse) is generated by AND circuit 85.

Similarly, as illustrated in FIG. 23, when the A phase output signal and the B phase output signal are short-circuited with each other, the down pulse (which is synchronized with the falling of the A phase output signal) generated by direction-discriminating pulsating circuit 52 and the down pulse (which is synchronized with the falling of the B phase output signal) generated by direction-discriminating pulsating circuit 53 are generated with the same timing. For this reason, a signal (down pulse) is generated by AND circuit 86.

Therefore, in both cases illustrated in FIGS. 22 and 23, because a count signal is input to counter 87, the count value increases like a pattern of 1, 2, 3, and 4. When the count value reaches a prescribed value, a carry output is sent to an abnormality detector 50 from counter 87. By being triggered by the carry output supplied from counter 87, abnormality detector 50 outputs error signals to the outside of encoder 3. The prescribed value is not limited in particular.

According to the fourth embodiment, as described above, encoder 3 is further provided with AND circuits 85 and 86 and counter 87. AND circuit 85 performs an AND operation of the up pulse of direction-discriminating pulsating circuit 52 and the up pulse of direction-discriminating pulsating circuit 53. AND circuit 86 performs an AND operation of the down pulse of direction-discriminating pulsating circuit 52 and the down pulse of direction-discriminating pulsating circuit 53. Counter 87 sets the count value according to output signals of AND circuits 85 and 86. The output signals of AND circuits 85 and 86 indicate that the result of the AND operation is "truth." Abnormality detector 50 outputs error signals when the count value of counter 87 reaches a prescribed value. This configuration allows detection of short-circuiting of the A phase external signal and the B phase external signal.

Each above-described embodiment presents an optical encoder as the incremental rotary encoder. However, the incremental rotary encoder according to embodiments is not limited to the optical type. That is, the encoder may be a magnetic type, for example.

According to an embodiment, a rotary encoder (rectangular wave incremental encoder) detects an internal abnormality of the concerned encoder. Therefore, the user can recognize an internal abnormality of the encoder without having to build or use a device for abnormality detection.

In all aspects, the embodiments disclosed herein are provided, only by way of example, and should not be limitedly construed. The scope of the claimed invention is not necessarily limited by the description of the above-described embodiments but is defined by the following claims, and all changes within the scope of the claims and within the meaning and scope equivalent to the scope of the claims may fall within the scope of the present invention.

What is claimed is:

1. A rotary encoder of an incremental type, comprising:
   a rotation detector that outputs a continuous wave signal of a first phase and a continuous wave signal of a second phase according to rotation of a rotating body, the continuous signal of the first phase and the continuous signal of the second phase having a phase difference from each other;
   a signal output unit that generates a rectangular wave output signal of the first phase and a rectangular wave output signal of the second phase from the continuous wave signal of the first phase and the continuous wave signal of the second phase, respectively and outputs the rectangular wave output signals of the first phase and the second phase from the rotary encoder;
   an internal signal generator that generates a rectangular wave internal signal of the first phase and a rectangular wave internal signal of the second phase from the continuous wave signal of the first phase and the continuous wave signal of the second phase, respectively;
   a first counter that sets a count value in response to a pulse edge of the rectangular wave internal signal of the first phase and resets the count value in response to a pulse edge of the rectangular wave output signal of the second phase;
   a second counter that sets a count value in response to a pulse edge of the rectangular wave internal signal of the second phase and resets the count value in response to a pulse edge of the rectangular wave output signal of the first phase; and
   an abnormality detector that detects an abnormality of the rotary encoder when the count value of at least one of the first and second counters reaches a prescribed value.

2. The rotary encoder according to claim 1, further comprising:
   a third counter that sets a count value in response to the pulse edge of the rectangular wave output signal of the first phase and resets the count value in response to the pulse edge of the rectangular wave internal signal of the second phase; and
   a fourth counter that sets a count value in response to the pulse edge of the rectangular wave output signal of the second phase and resets the count value in response to the pulse edge of the rectangular wave internal signal of the first phase,
   wherein the abnormality detector detects an abnormality of the rotary encoder when the count value of at least one of the first to fourth counters reaches the prescribed value.

3. The rotary encoder according to claim 1, further comprising:
   an input circuit that receives the rectangular wave output signals of the first phase and the second phase; and a cable,
      wherein the cable includes a first wiring and a second wiring to output the rectangular wave output signals of the first phase and the second phase from the signal output unit to an outside of the rotary encoder, respectively, a third wiring and a fourth wiring to input the rectangular wave output signals of the first phase and the second phase to the input circuit, and outer covers covering the first to fourth wirings.

4. The rotary encoder according to claim 3,
   wherein the third wiring and the fourth wiring are connected to the first wiring and the second wiring, respectively, in the vicinity of a terminal portion of the cable.

5. The rotary encoder according to claim 1,
   wherein the encoder comprises:
      an input circuit that receives the rectangular wave output signals of the first phase and the second phase from the signal output unit;
      a housing that encases at least the rotation detector, the signal output unit, the first and second counters, the abnormality detector, and the input circuit; and
      signal paths inside the housing that accept the rectangular wave output signals of the first phase and the second phase from the signal output unit, to the input circuit.

6. The rotary encoder according to claim 1,
   further comprising:
      a first pulse generating circuit that generates a first pulse in response to a pulse edge of the rectangular wave output signal of the first phase;
      a second pulse generating circuit that generates a second pulse in response to a pulse edge of the rectangular wave output signal of the second phase;
      an AND circuit that performs an AND operation of the first pulse and the second pulse; and
      a short-circuit detecting counter that sets a count value according to an output signal of the AND circuit,
      wherein the abnormality detector detects an abnormality of the rotary encoder when the count value of the short-circuit detecting counter reaches a prescribed value.

7. The rotary encoder according to claim 1,
   wherein the abnormality detector outputs a first error signal and a second error signal in response to detecting an abnormality of the rotary encoder.

8. A method of detecting an abnormality of a rotary encoder of an incremental type, comprising:
   outputting a continuous wave signal of a first phase and a continuous wave signal of a second phase from a rotation detector according to rotation of a rotating body, the continuous signal of the first phase and the continuous signal of the second phase having a phase difference from each other;

generating a rectangular wave output signal of the first phase and a rectangular wave output signal of the second phase from the continuous wave signal of the first phase and the continuous wave signal of the second phase, respectively;

outputting the rectangular wave output signals of the first phase and the second phase from the rotary encoder;

generating a rectangular wave internal signal of the first phase and a rectangular wave internal signal of the second phase from the continuous wave signals of the first phase and the second phase;

setting a first count value in response to a pulse edge of the rectangular wave internal signal of the first phase and resetting the first count value in response to a pulse edge of the rectangular wave output signal of the second phase;

setting a second count value in response to a pulse edge of the rectangular wave internal signal of the second phase and resetting the second count value in response to a pulse edge of the rectangular wave output signal of the first phase; and detecting an abnormality of the rotary encoder when at least one of the first and second count values reaches a prescribed value.

9. The method of detecting an abnormality of a rotary encoder according to claim 8, further comprising:

setting a third count value in response to the pulse edge of the rectangular wave output signal of the first phase and resetting the third count value in response to the pulse edge of the rectangular wave internal signal of the second phase; and setting a fourth count value in response to the pulse edge of the rectangular wave output signal of the second phase and resetting the fourth count value in response to the pulse edge of the rectangular wave internal signal of the first phase, wherein a rotary encoder abnormality is detected when at least one of the first to fourth count values reaches the prescribed value.

10. The method of detecting an abnormality of a rotary encoder according to claim 8, further comprising:

generating a first pulse in response to a pulse edge of the rectangular wave output signal of the first phase;

generating a second pulse in response to a pulse edge of the rectangular wave output signal of the second phase;

performing an AND operation of the first pulse and the second pulse; and setting a count value for short-circuit detection when a result of the AND operation is truth, wherein a rotary encoder abnormality is detected when the count value for short-circuit detection reaches the prescribed value.

11. The method of claim 8, wherein a signal output unit generates a rectangular wave output signal of the first phase and a rectangular wave output signal of the second phase;

a signal generator generates a first pulse in response to a pulse edge of the rectangular wave output signal of the first phase;

an internal signal generator generates a rectangular wave internal signal of the first phase and a rectangular wave internal signal of the second phase from the continuous wave signals of the first phase and the second phase;

a first counter sets a first count value in response to a pulse edge of the rectangular wave internal signal of the first phase and resets the first count value in response to a pulse edge of the rectangular wave output signal of the second phase;

a second counter sets a second count value in response to a pulse edge of the rectangular wave internal signal of the second phase and resets the second count value in response to a pulse edge of the rectangular wave output signal of the first phase; and an abnormality detector detects an abnormality of the rotary encoder when at least one of the first and second count values reaches a prescribed value.

\* \* \* \* \*